April 15, 1947. M. EWALD 2,418,827
MACHINE FOR STEMMING, SPLITTING, PEELING AND CORING PEARS
Original Filed Oct. 6, 1932 19 Sheets-Sheet 1

Inventor
Mark Ewald
By [signature]
Att'y.

April 15, 1947. M. EWALD 2,418,827
MACHINE FOR STEMMING, SPLITTING, PEELING AND CORING PEARS
Original Filed Oct. 6, 1932 19 Sheets-Sheet 2

Inventor:
Mark Ewald

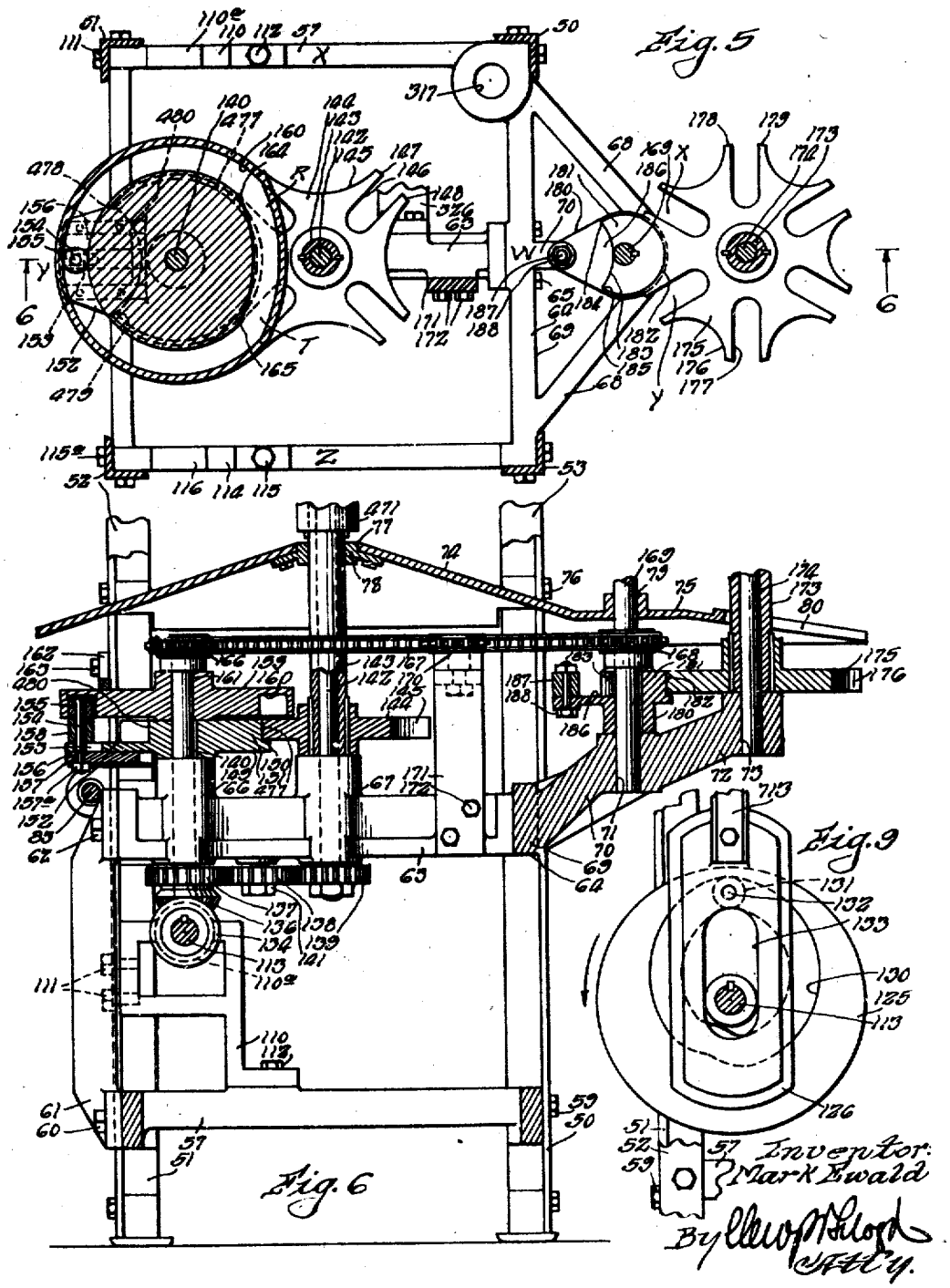

April 15, 1947.   M. EWALD   2,413,827
MACHINE FOR STEMMING, SPLITTING, PEELING AND CORING PEARS
Original Filed Oct. 6, 1932   19 Sheets-Sheet 6
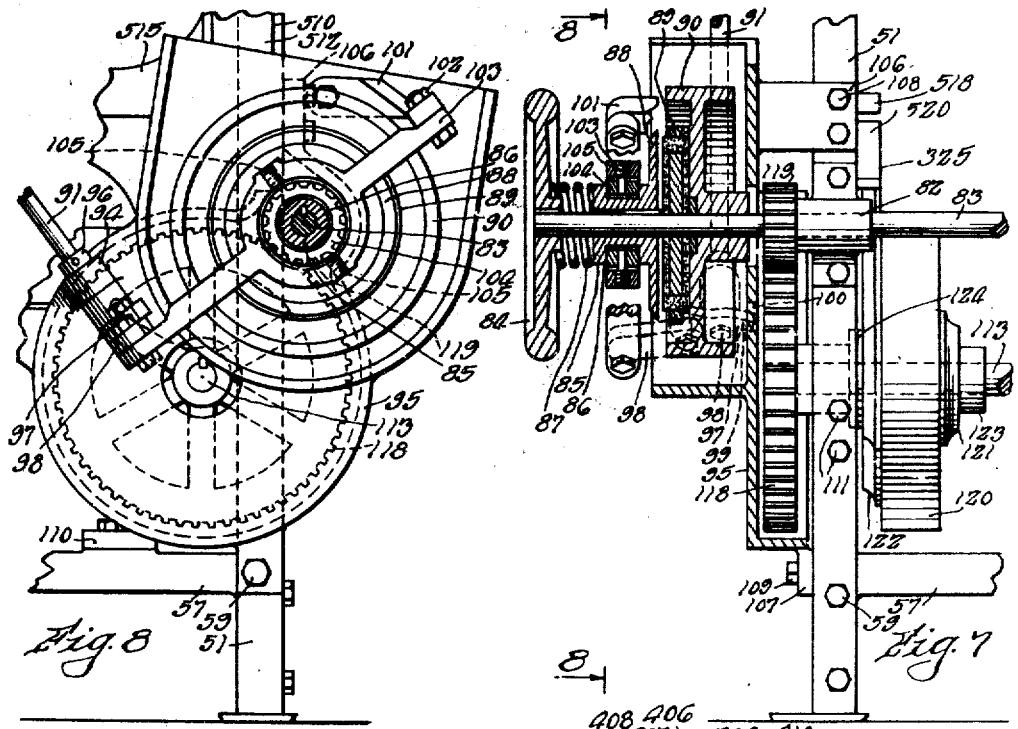
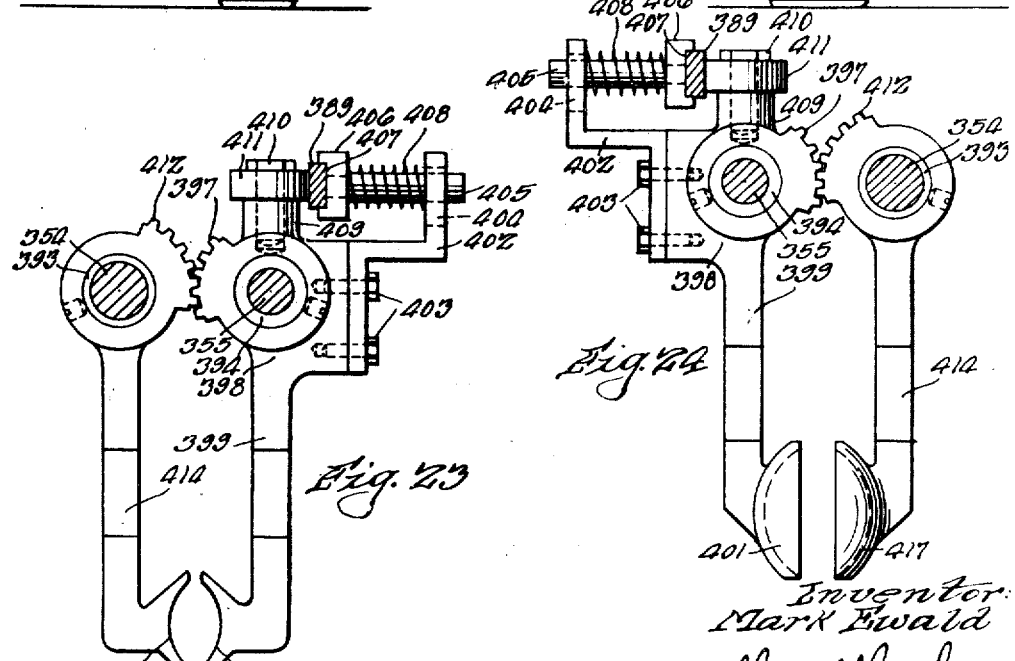
Inventor:
Mark Ewald Inventor:
Mark Ewald April 15, 1947. M. EWALD 2,418,827
MACHINE FOR STEMMING, SPLITTING, PEELING AND CORING PEARS
Original Filed Oct. 6, 1932 19 Sheets-Sheet 8

April 15, 1947.  M. EWALD  2,418,827
MACHINE FOR STEMMING, SPLITTING, PEELING AND CORING PEARS
Original Filed Oct. 6, 1932  19 Sheets-Sheet 9

Inventor:
Mark Ewald
By [signature]
Atty.

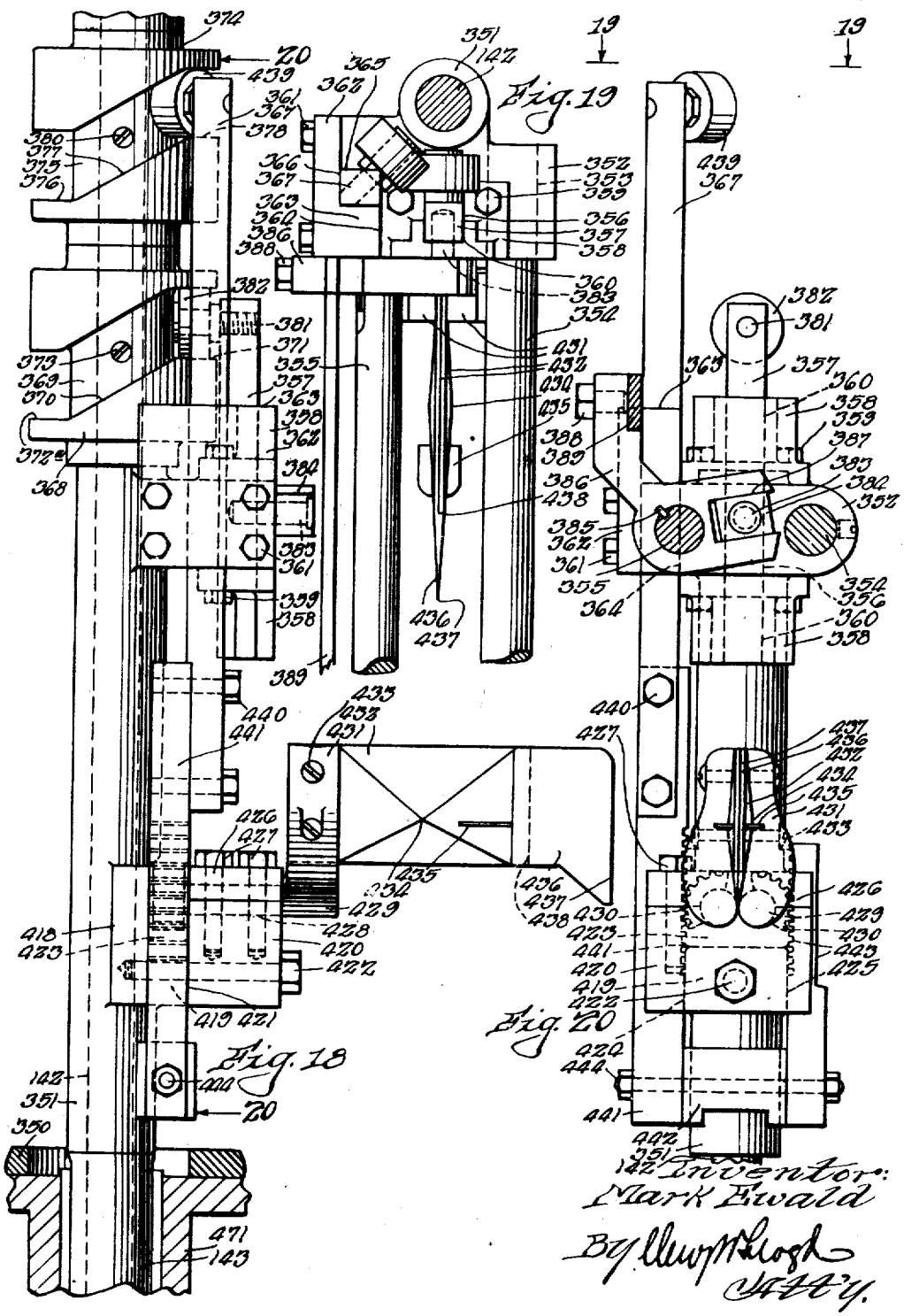

April 15, 1947.  M. EWALD  2,418,827
MACHINE FOR STEMMING, SPLITTING, PEELING AND CORING PEARS
Original Filed Oct. 6, 1932  19 Sheets-Sheet 11
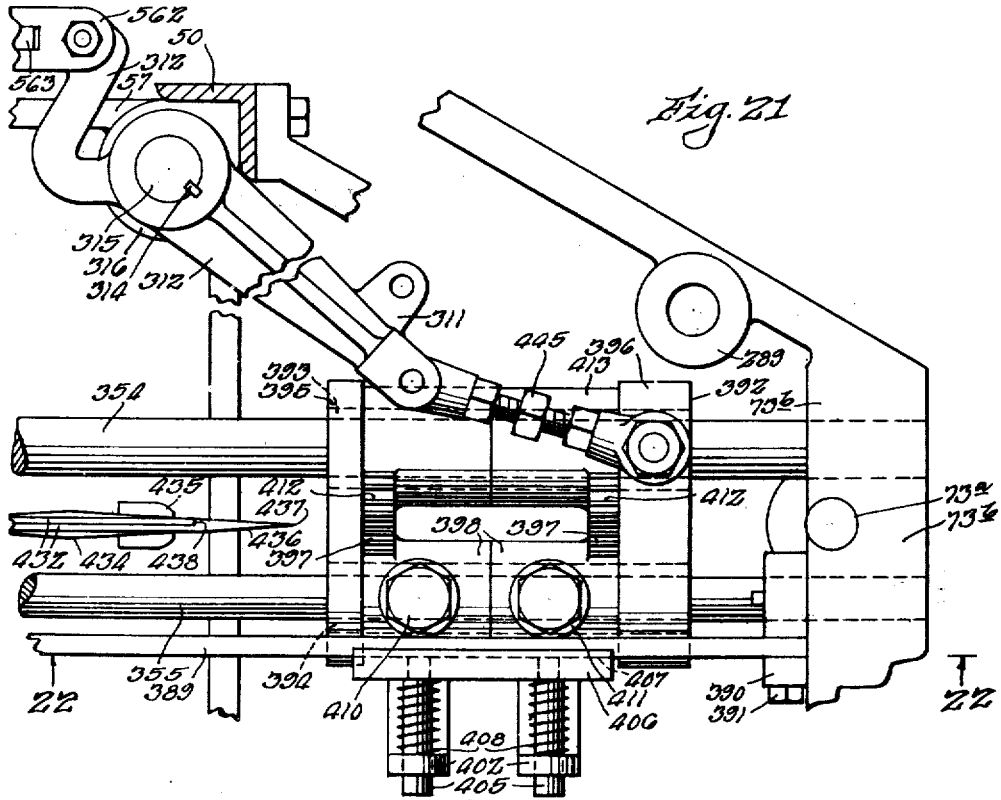
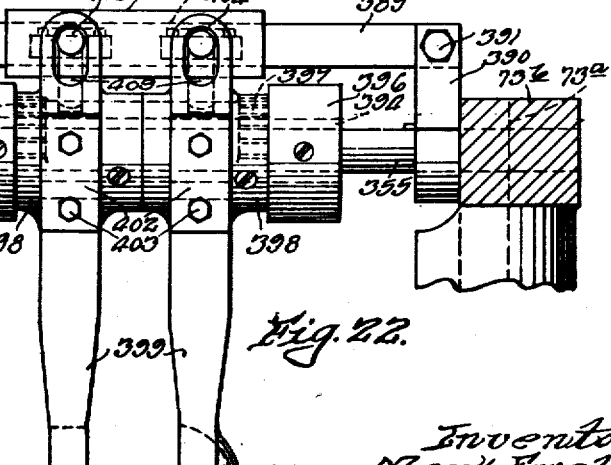
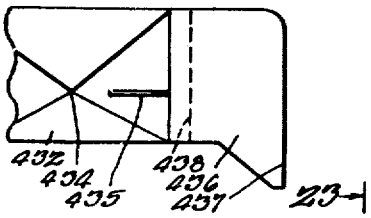
Inventor:
Mark Ewald

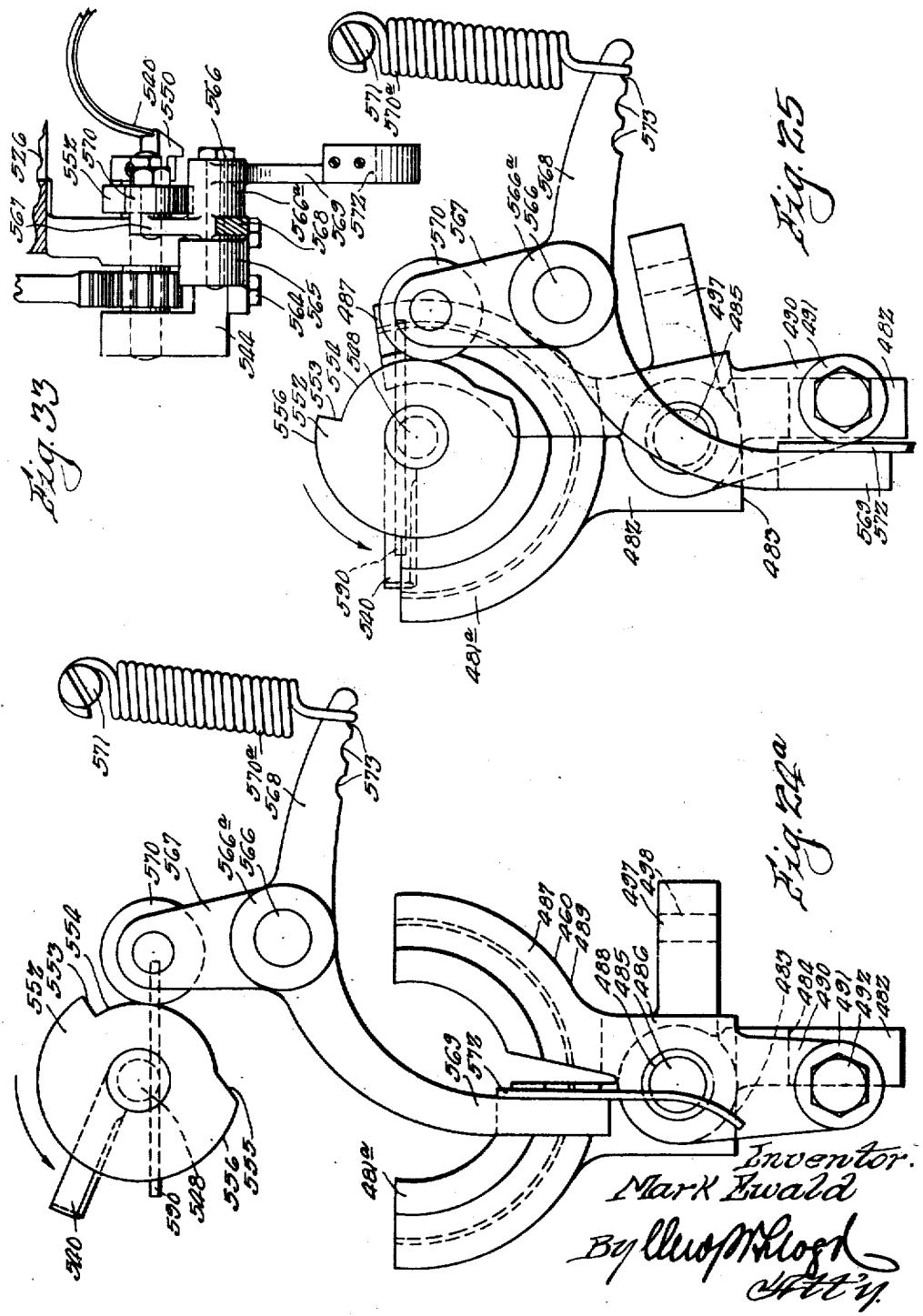

April 15, 1947. M. EWALD 2,418,827
MACHINE FOR STEMMING, SPLITTING, PEELING AND CORING PEARS
Original Filed Oct. 6, 1932 19 Sheets-Sheet 13
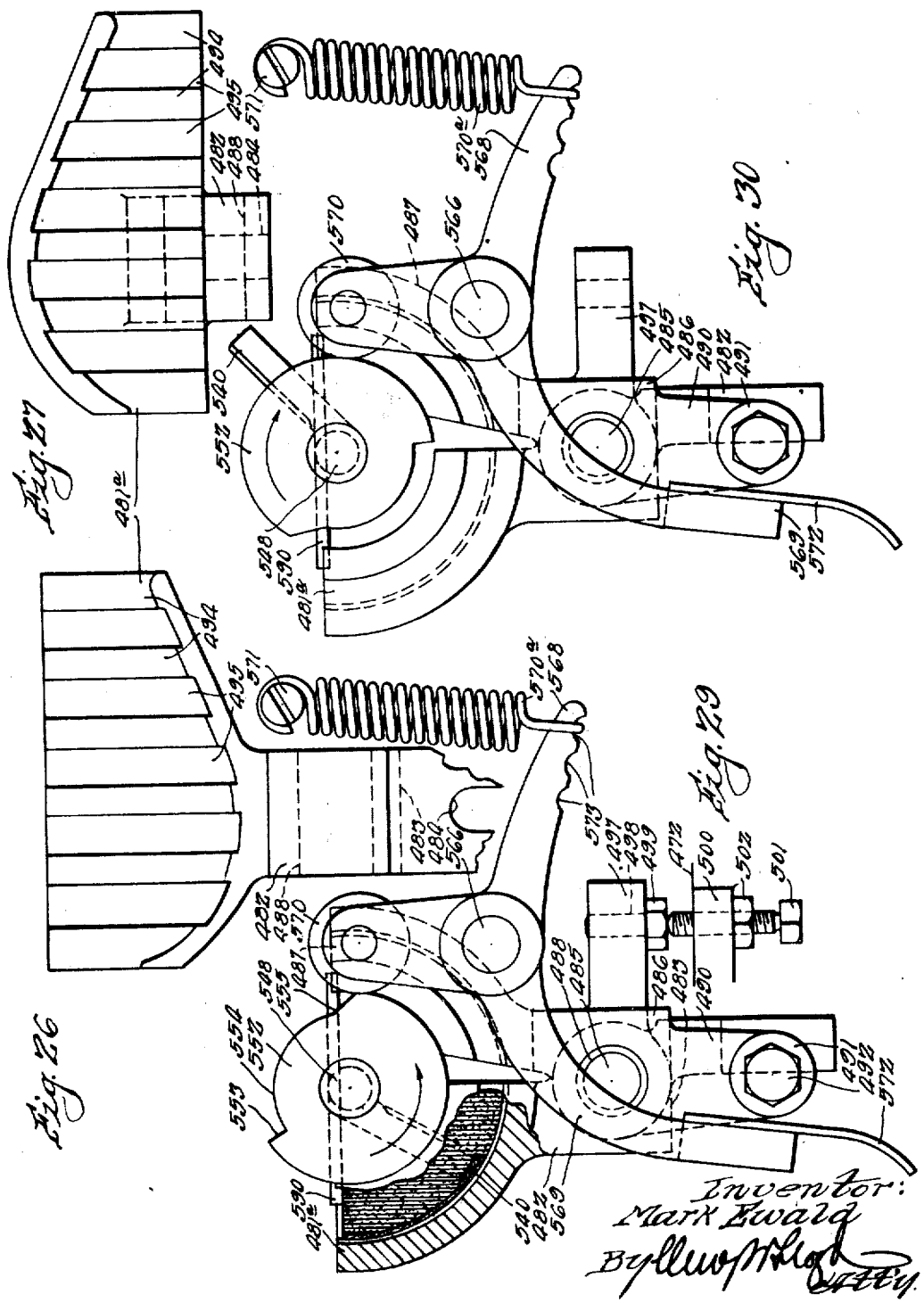

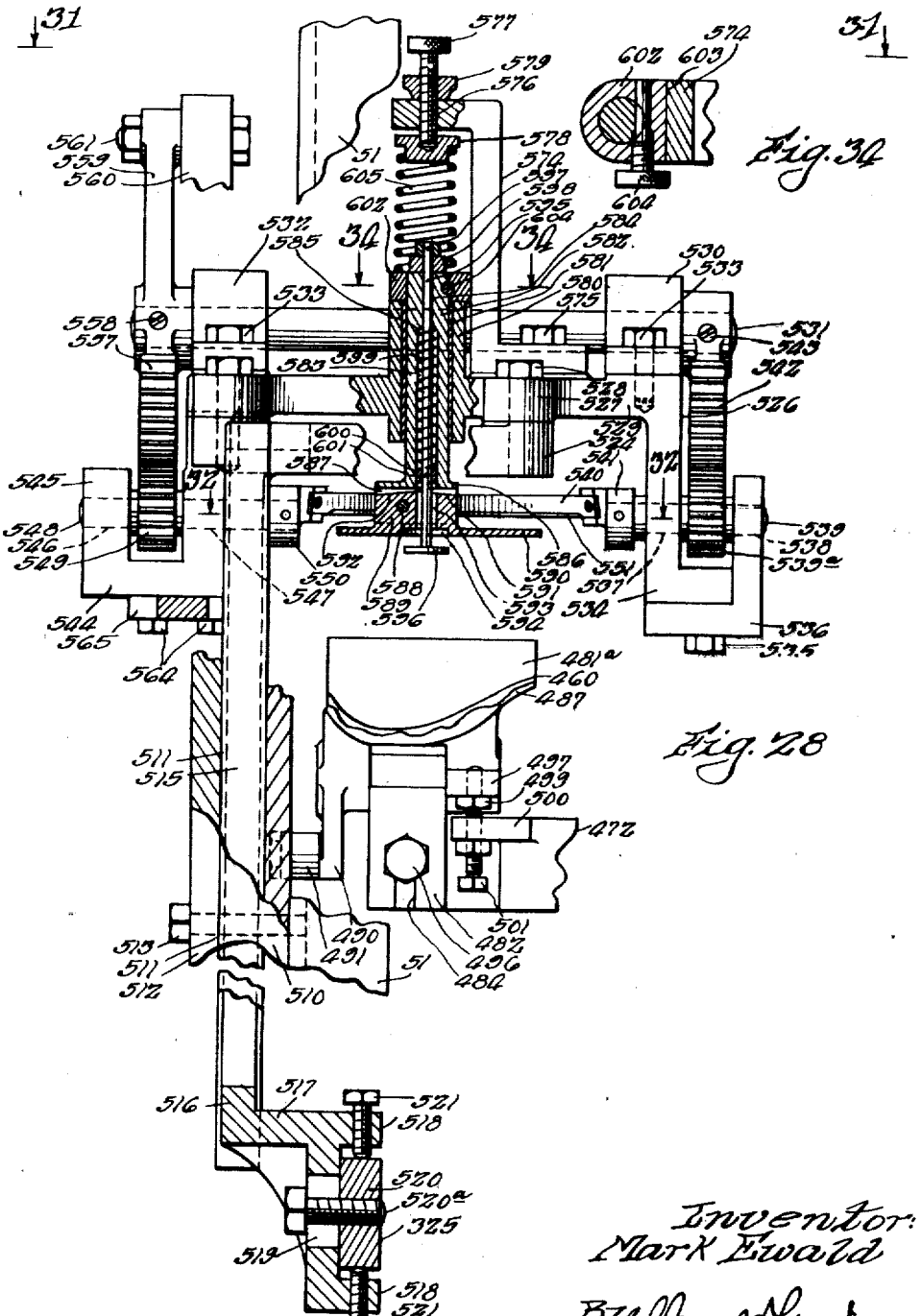

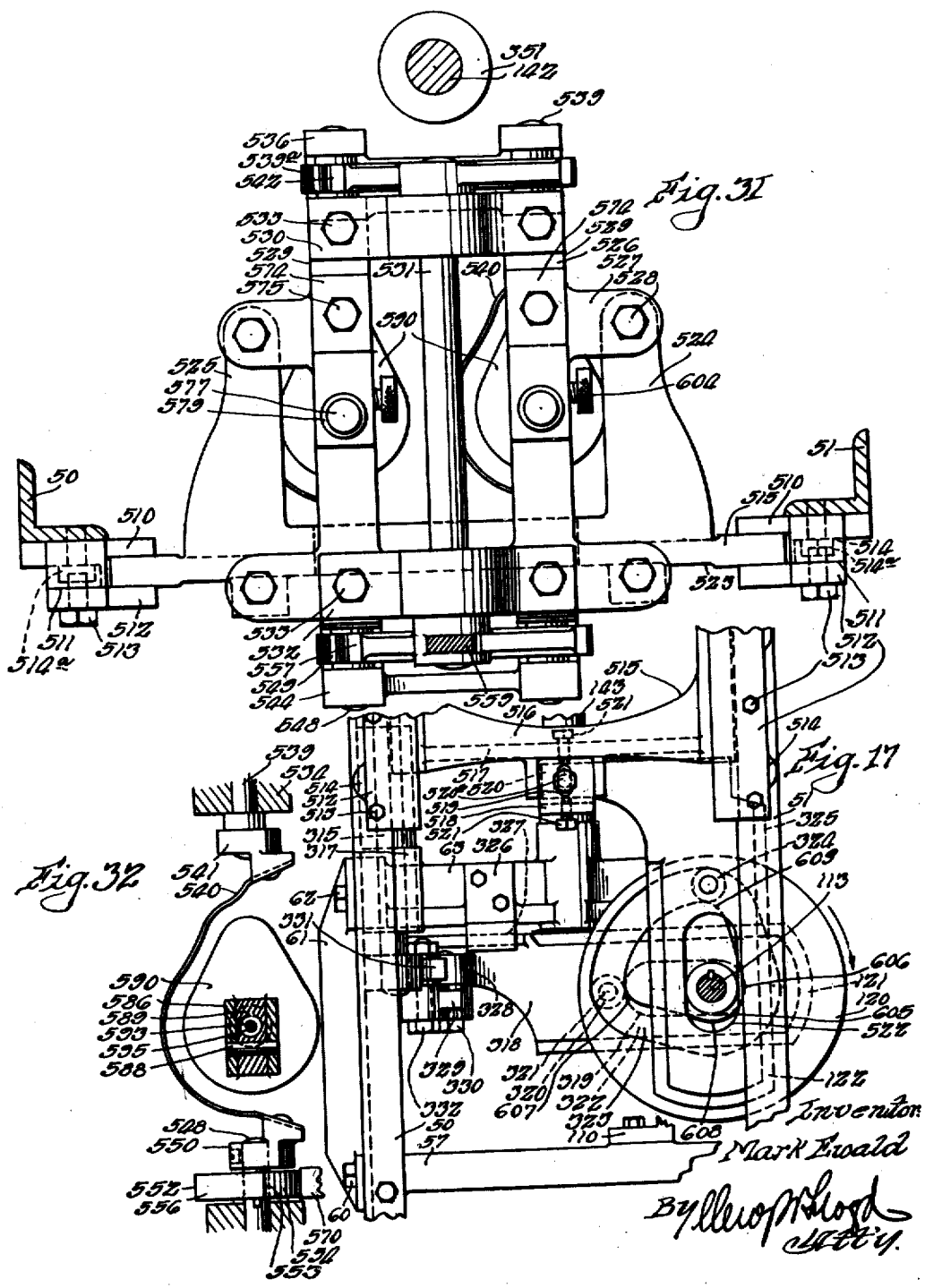

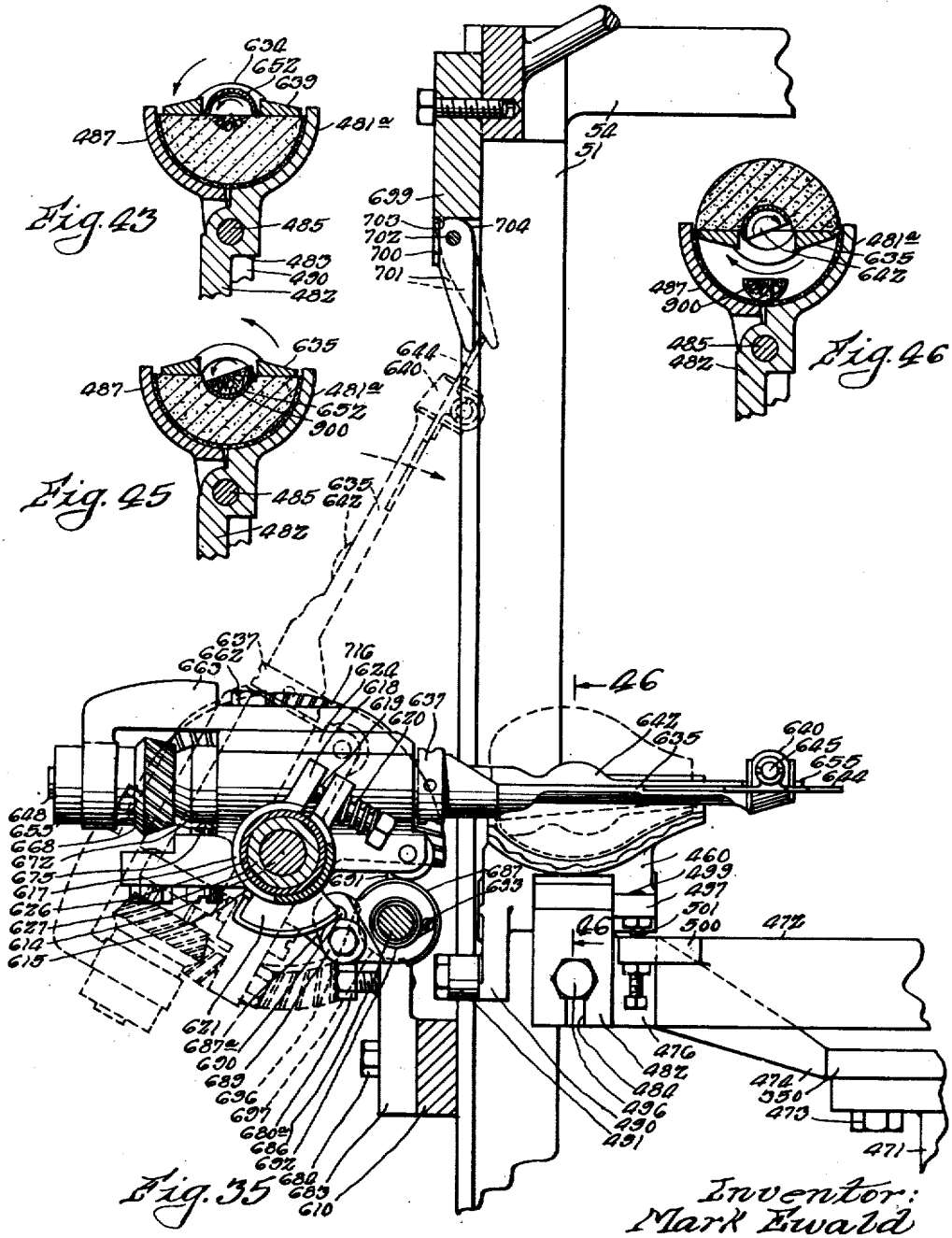

April 15, 1947. M. EWALD 2,418,827
MACHINE FOR STEMMING, SPLITTING, PEELING AND CORING PEARS
Original Filed Oct. 6, 1932 19 Sheets-Sheet 17
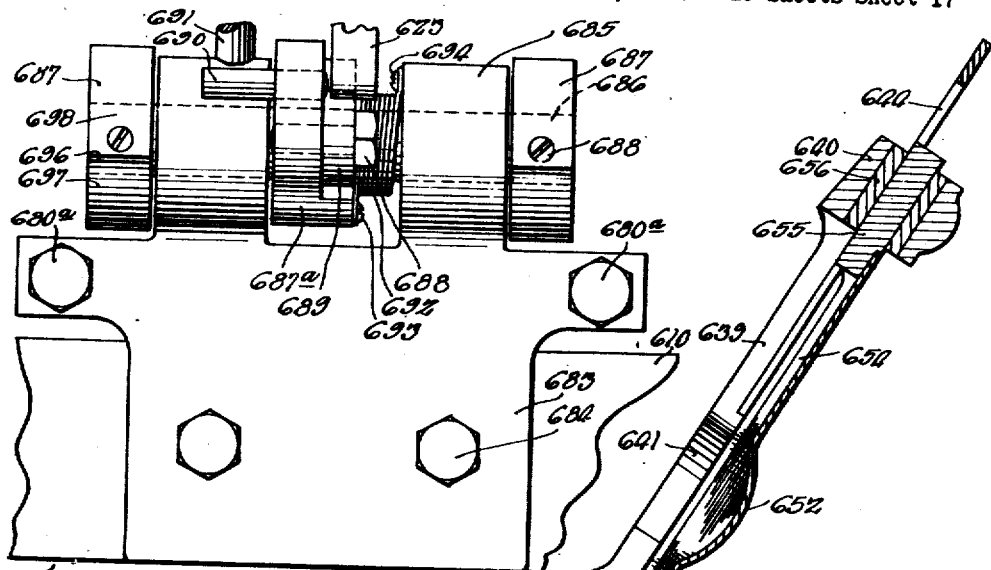
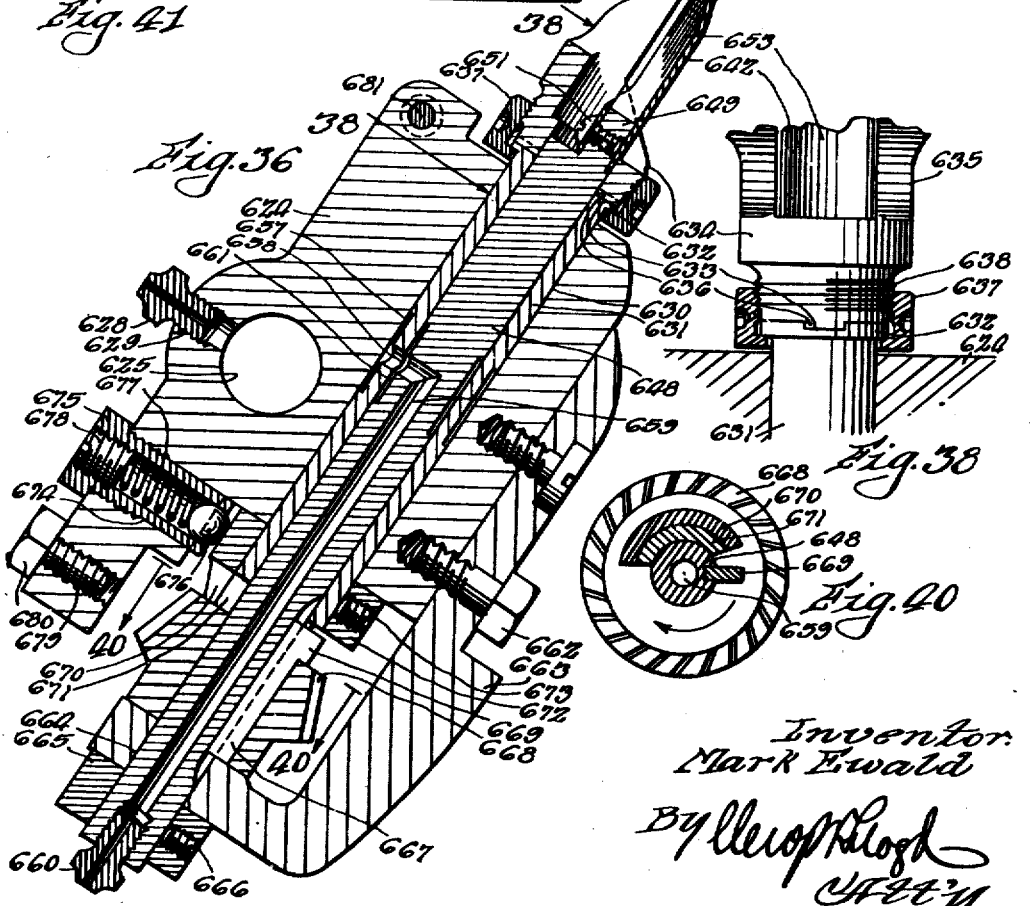
Inventor:
Mark Ewald

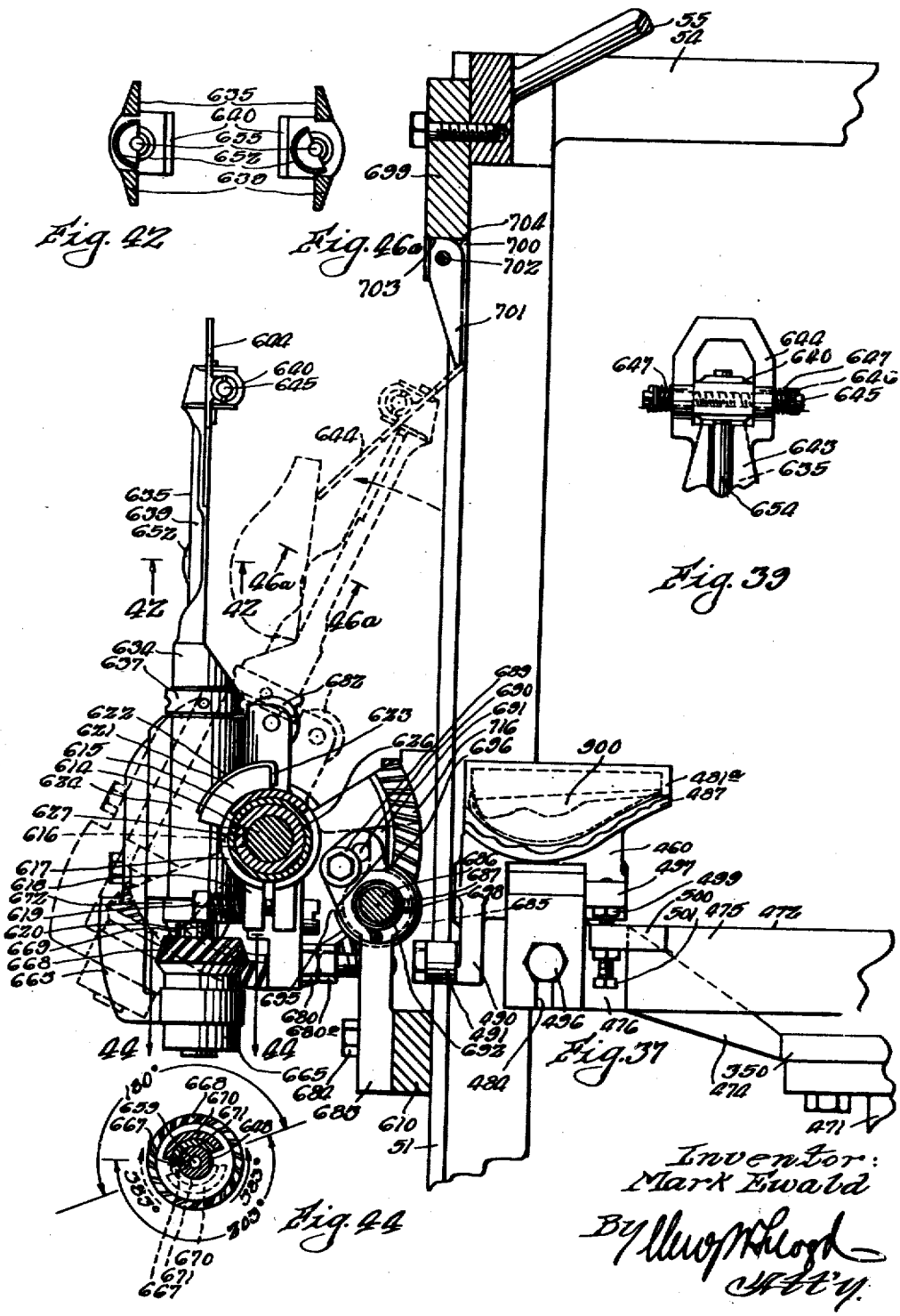

April 15, 1947. M. EWALD 2,418,827
MACHINE FOR STEMMING, SPLITTING, PEELING AND CORING PEARS
Original Filed Oct. 6, 1932 19 Sheets-Sheet 19

Inventor
Mark Ewald

Patented Apr. 15, 1947

2,418,827

UNITED STATES PATENT OFFICE 2,418,827

MACHINE FOR STEAMING, SPLITTING, PEELING, AND CORING PEARS

Mark Ewald, Olympia, Wash., assignor to Special Equipment Company, Portland, Oreg., a corporation of Oregon Application October 6, 1932, Serial No. 636,447

15 Claims. (Cl. 146—33)

This invention has to do with a machine for treating fruit and relates particularly to such a machine adapted to stem, split, peel and core pears.

The following earlier applications of the applicant contain subject matter related to the present application:

Application of Mark Ewald, Serial Number 621,857, filed July 11, 1932, for Bobbing device, in which there are claims directed to the bobbing device of the present machine.

Application of Mark Ewald, Serial Number 621,914, filed July 11, 1932, for Feeding mechanism for fruit, and in which application there are claims directed to a carriage having clamping members for engaging a fruit to conduct it inwardly of the present fruit treating machine. Other claims in this co-pending application are directed to the combination of said fruit carriage and the feed turret of the present machine.

Application of Mark Ewald, Serial Number 625,851, filed July 29, 1932, for Peeling mechanism, and in which there are claims directed to a reciprocable peeling mechanism including a fruit engaging pad and knock-out pad removably contained therein.

Application of Mark Ewald, Serial Number 627,549, filed August 5, 1932, for Fruit holding cup, and in which application there are claims directed to the present type of grooved fruit holding cup.

Application of Mark Ewald, Serial Number 635,061, filed September 27, 1932, for Pear treating apparatus, and in which there are claims directed to fruit coring means, fruit peeling means, and a grooved fruit holding cup.

It is an object of the present invention to provide a machine adapted to receive a pear in its natural growth and to fully prepare it for canning in a manner without mutilation resulting thereto.

Another object of the present invention is the provision of a pear treating device capable of performing definite successive operations upon a fruit to achieve fruit sections of a uniform character for canning.

Another object of the present invention is the provision of mechanical means for increasing the speed at which pears may be prepared for canning.

Another object of the present device is to provide an expedient means for the treatment of pears and which will not become clogged to interfere with its operation.

Still another object of the present invention is the provision of a pear treating device which disposes of the fruit separately from the peeling and the core.

These objects and other desirable objects are obtained by the novel arrangement, unique combination, and the improved construction of the parts comprising the invention which is fully set forth in the following description and the accompanying drawings hereby made a part of this specification and in which:

Figures 1, 2, 3, and 4 are side elevations of the machine taken from the front, right side, back, and left side, respectively;

Figure 5 is a horizontal section of the machine taken at the line 5—5 of Figure 4;

Figure 6 is a fragmentary sectional view of the machine taken on the line 6—6 of Figure 5;

Figure 7 is a sectional view of the driving mechanism for the device;

Figure 8 is a fragmentary view of the machine illustrating a clutch mechanism and taken along the line 8—8 of Figure 7;

Figure 9 is a side view of a cam and cam follower taken along the line 9—9 of Figure 3;

Figure 14 is a perspective view of fingers complemental to a feed cup;

Figure 15 is a sectional view of a fragment of the feed turret illustrated in Figures 12 and 13;

Figure 16 is a perspective view of a cam for elevating feed cups, the view being taken on the line 16—16 of Figure 15;

Figure 17 is a sectional view of the device illustrating a cam mechanism and taken at the line 17—17 in Figure 3;

Figure 18 is a side elevation of parts for the operation of a splitting carriage taken on the line 18—18 of Figure 1;

Figure 19 is a fragmentary perspective view of the parts shown in Figure 18 and taken at the line 19—19 in Figure 20;

Figure 20 is a side elevation of the parts shown in Figure 18 as indicated by the line 20—20 in that figure;

Figure 21 is an orthographic projection of the splitting carriage and taken from above at the line 21—21 in Figure 4;

Figure 22 is a side view of the splitting carriage taken at the line 22—22 in Figure 21;

Figure 23 is a sectional view of the splitting carriage taken along the line 23—23 in Figure 22;

Figure 24 is a sectional view of the splitting carriage taken at the line 24—24 in Figure 22;

Figure 24a is an end view of a fruit cup in the open position;

Figure 25 is an end view of a closed fruit cup in combination with parts shown in a different operating position than with the cup illustrated in Figure 24a;

Figure 26 is a side view of a fruit cup element illustrating the internal wall structure;

Figure 27 is a perspective view of the cup element shown in Figure 27 and taken from above;

Figure 28 is a sectional view of the device illustrating the peeling mechanism and taken along the line 28—28 of Figure 2;

Figure 29 is an end view of a fruit cup with parts broken away for purposes of illustration;

Figure 30 is an end view of the cup shown in Figures 24a, 25 and 29 at a different stage of operation;

Figure 31 is a perspective view of the peeling mechanism taken from above at the line 31—31 in Figure 28;

Figure 32 is a sectional view of the peeling mechanism illustrating the contour taken by a peeling blade, the view being taken at the line 32—32 in Figure 28;

Figure 33 is a sectional view of the peeling mechanism taken at the line 33—33 in Figure 2;

Figure 34 is a sectional view of the peeling mechanism taken at the line 34—34 of Figure 28;

Figure 35 is a sectional view of the coring mechanism of the machine;

Figure 36 is a longitudinal sectional view of a coring instrumentality;

Figure 37 is a sectional view of the coring device taken at the line 37—37 in Figure 3 incident to a different stage of operation than is illustrated in Figure 35;

Figure 38 is an enlarged sectional view taken at the line 38—38 in Figure 36 and illustrating the manner in which a coring paddle is connected to a spindle therefor;

Figure 39 is a detailed view of the end of a coring instrumentality;

Figure 40 is a sectional view of a coring instrumentality taken at the line 40—40 in Figure 36;

Figure 41 is a perspective view of auxiliary parts of the coring mechanism;

Figure 42 is a sectional view of a coring spoon and coring paddle taken on the line 42—42 of Figure 37;

Figure 43 is a sectional view of a coring paddle and coring spoon in combination with a fruit cup;

Figure 44 is a sectional view of a coring instrumentality taken on the line 44—44 of Figure 37;

Figure 45 is a sectional view of the coring paddle and fruit cup illustrated in Figure 43 incident to a different stage of operation;

Figure 46 is a sectional view of the coring paddle and fruit cup shown in Figures 43 and 45 taken at the line 46—46 in Figure 35 at a still different stage of operation;

Figure 46a is a sectional view of a coring spoon and coring paddle taken along the line 46a—46a of Figure 37;

Figure 49 is a side view of the splitting knife.

Like reference characters will be used throughout the following description and in the drawings for designating similar parts of the invention.

Figure 1:
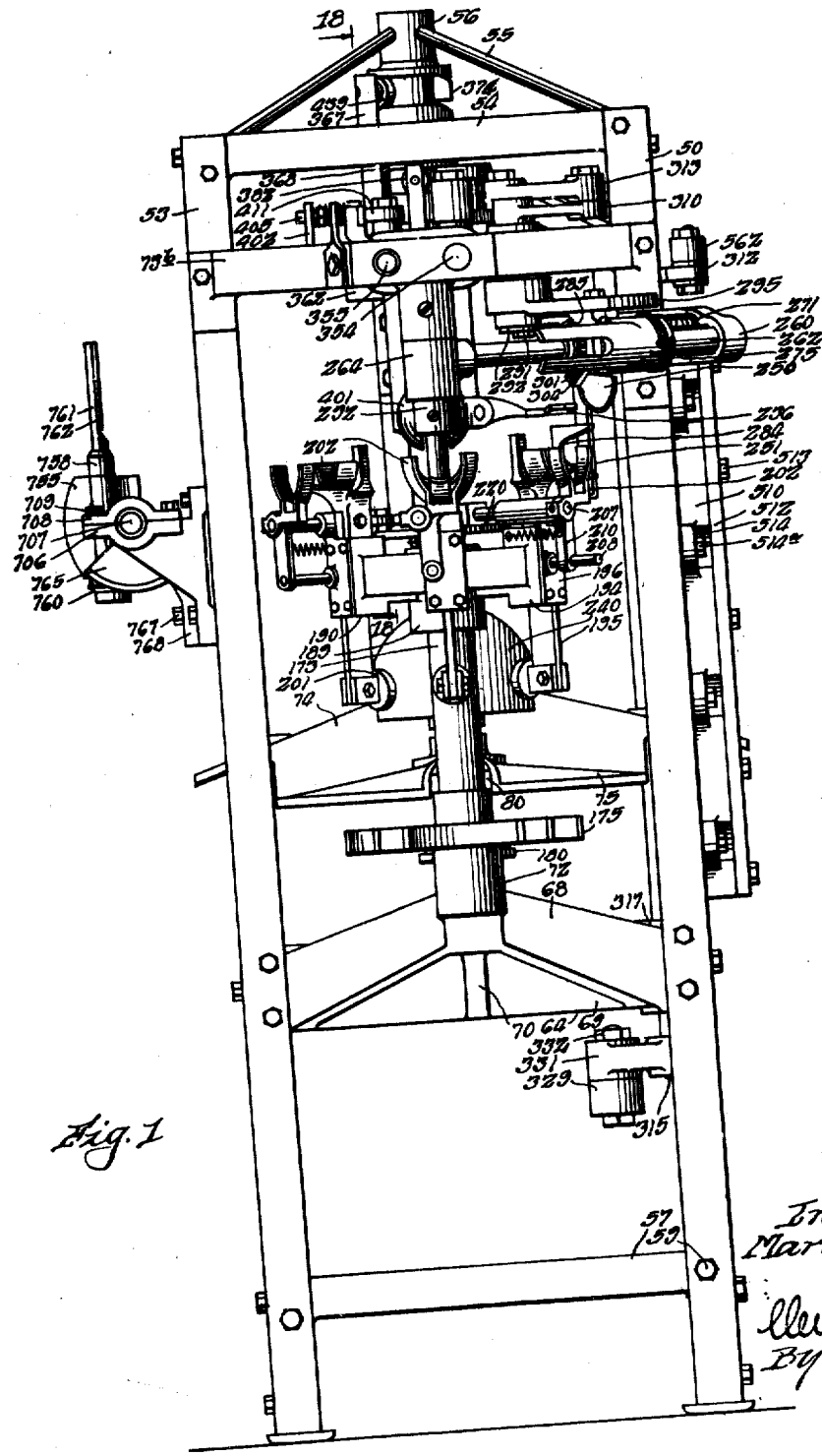

In order to make the description more easily understood, it will be divided according to the various distinct parts of the machine. Attention will first be directed to the machine frame.

*The frame*

The frame for the device is constructed about four upright members 50, 51, 52, and 53, which are shown in Figures 1, 2, 3, 4, and 5. Upright members 50, 51, 52, and 53 are disposed at the four corners of a square and are supported in the selected position at their top by a square frame member 54 which has radiating inwardly and upwardly from the four corners thereof brace rods 55 for the support of a bearing 56 which coincides with the vertical center axis of the frame. Near the bottom of the four angle upright members is a square frame piece 57 which is, in the present instance, a single casting. If desired, the frame piece 57 may comprise four bars joined at their ends. Bolts 58 hold the frame member 54 to the upright angle pieces while bolts 59 serve to hold the lower frame piece. 57 in the assembled position.

Figure 3:
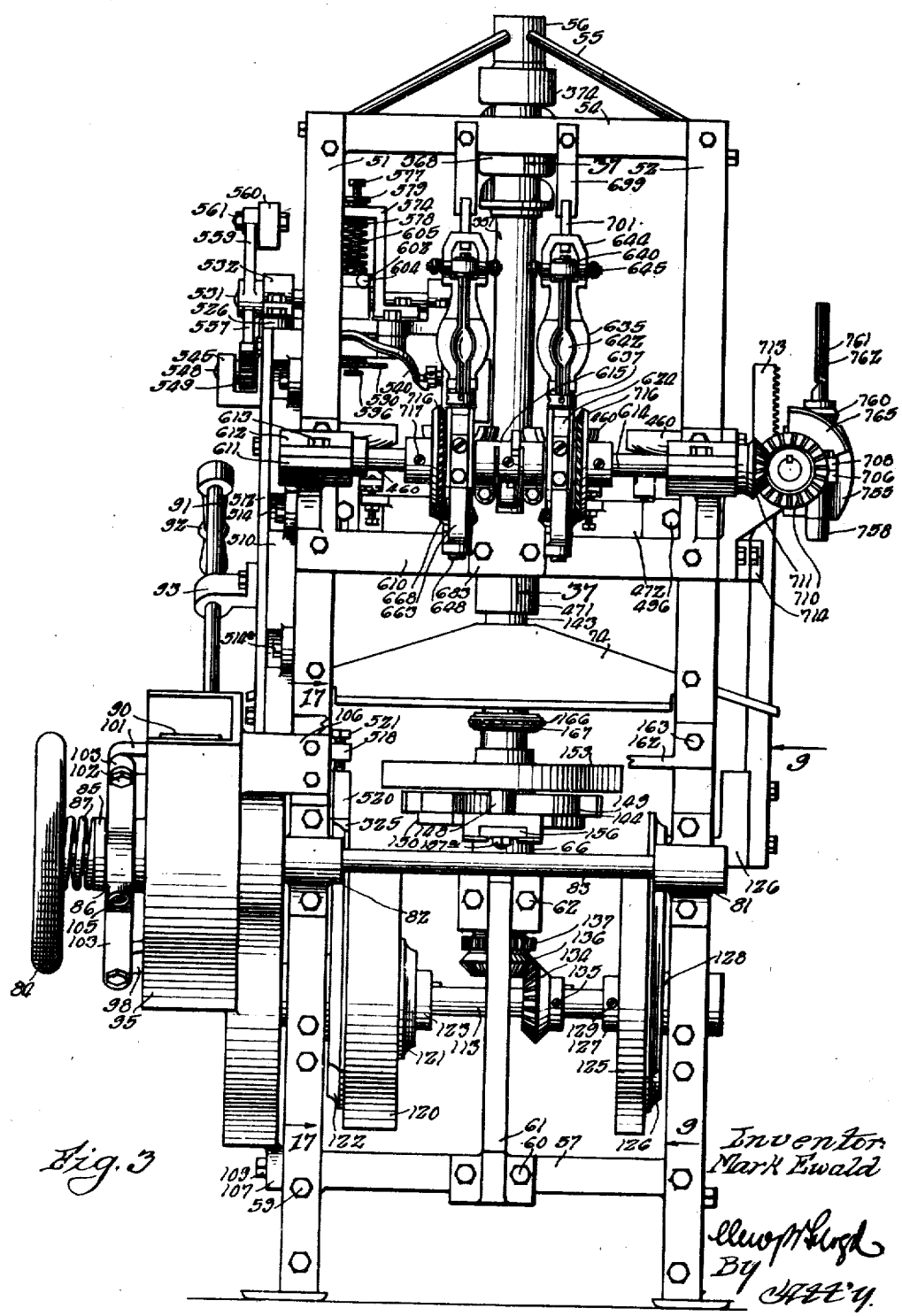

Attached to the back side of the frame piece 57, Figure 3, by means of bolts 60 is an upright bracket 61 to which is attached by means of bolts 62 a cross member 63, Figure 6. The opposite and front end of the cross member 63 is bolted to the center of a generally triangular frame member 64 by bolts 65. Bearings 66 and 67 are within the cross member 63, the latter named bearing being axially alined with the bearing 56 at the top of the machine.

Two legs 68 of the frame member 64 extend upwardly and forwardly from opposite ends of the bar 69 extending between the frame upright members 50 and 53 where they enjoin with a third leg 70 which extends from the center of the bar 69. A vertical bearing 71 is formed within the frame piece 64 at the point where the members 68 and 70 are confluent. Forwardly of the bearing 71 and at the end of an arm 72 is a vertical bearing 73.

Above the frame members 63 and 64 is a hood 74 which, in addition to serving as a frame brace member, provides a covering for the parts of the mechanism therebeneath. Four corners of the hood 74 enjoin the four angle upright members 50, 51, 52, and 53, while a portion 75 thereof projects forwardly over the frame piece 64. Bolts 76 provide means for holding the hood 74 in position to the upright frame members. A bearing 77 is provided in the hood 74 coincident with the vertical axis defined by the bearings 67 and 56, see Figure 6. A bearing block 78 is attached to the hood 74 in alinement with the bearing 77. In the forwardly projecting portion 75 of the hood 74 is a bearing 79 and a slot 80, the latter extending inwardly of the hood from the most forward edge thereof.

*The driving mechanism*

In Figure 3 there will be noted two bearing blocks 81 and 82 in common support of a drive shaft 83. The shaft 83 extends to the left of the bearing 82, Figures 3 and 7, and has upon the extended end thereof a hand wheel 84. To the right of the hand wheel 84 there is keyed to the shaft 83 a slidable flanged collar 85. Between the flanges of the collar is formed a groove 86. Intermediate the collar 85 and the hand wheel 84 is a compression spring 87 which is seated against the hand wheel 84 for constantly urging the collar 85 to the right.

To the right of a flange 88 upon the collar 85 is a friction disc 89 for commonly engaging a drive pulley 90 and the flange 88 when the collar 85 is allowed to be forced to the right by the compression spring 87. When not engaged by the friction disc 89 the pulley 90 is free to rotate about the shaft 83.

Figure 2:
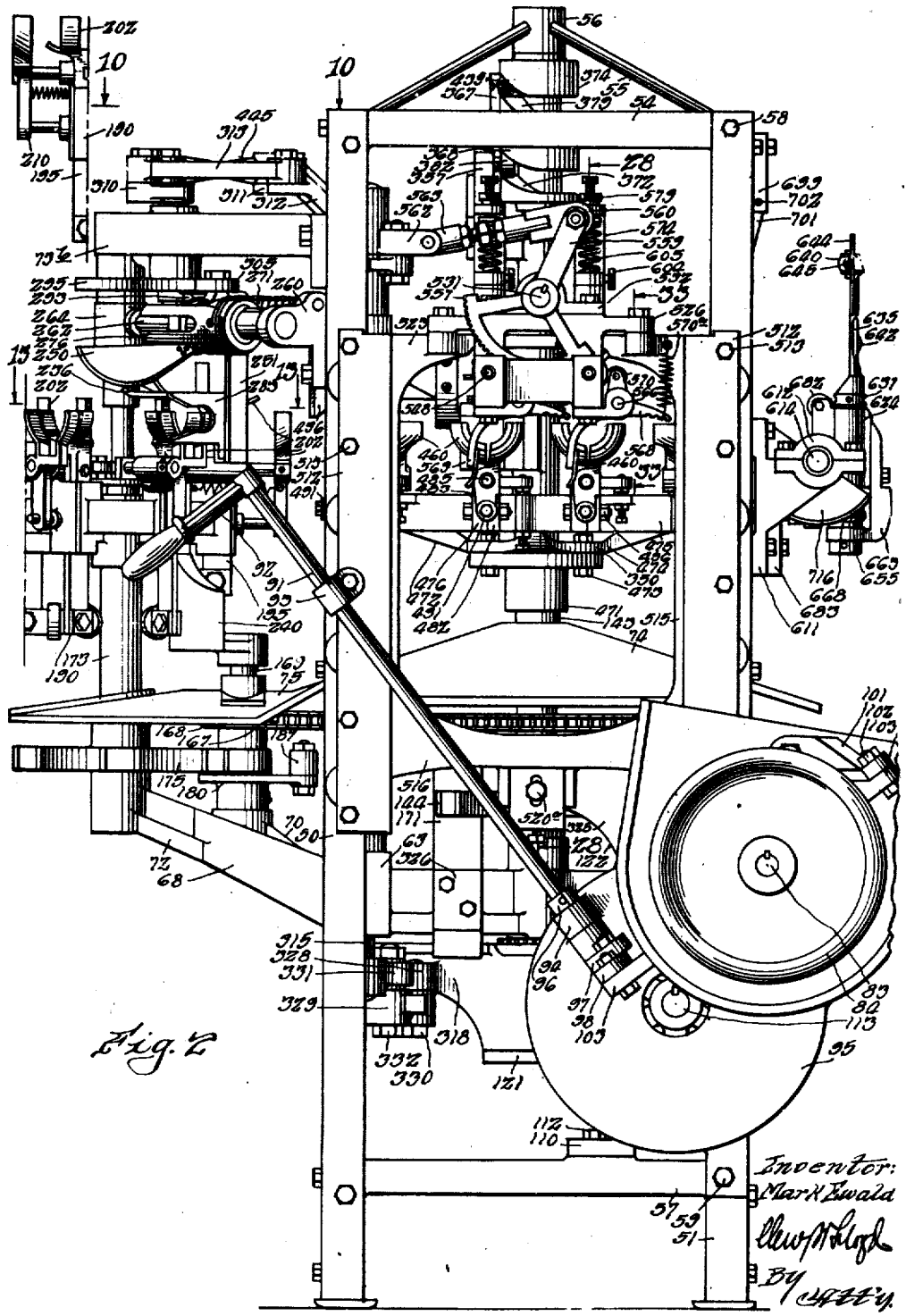

For throwing the clutch arrangement consisting of the friction disc 89 and the flanged collar 85 into engagement with the pulley 90 for driving the shaft 83 is a rod 91 having a handle member 92 on the upper end thereof (Figure 2). A bearing bracket 93 holds the operating rod 91 into position with the upright member 50. At the lower end of the operating rod 91, and which is rotatively held within an apertured ear 94 projecting from a gear guard 95 is a collar 96 to prevent longitudinal displacement of the operating rod. A lever arm 97 is attached to the lower extremity of the operating rod 91 by means of a bolt 98 (Figures 7 and 8) in a non-rotative manner. One end of the lever 97 is pivotally connected to a link 98 while the opposite end of the lever configures a lug 99 for engaging an aperture 100 in the gear guard 95.

Bolted to the face of the gear guard 95 which partially houses the drive pulley 90 is a bracket 101 to which is pivotally keyed by means of a bolt 102 an arm 103. The lower end of the arm 103 is pivotally connected to the extended end of the link 98 while the center portion of such arm is enlarged and configures a ring into which there is inserted a bushing 104 to be held in place by means of set screws 105.

Lugs 106 and 107 projecting from the upper and lower parts respectively of the gear guard housing 95 are attached to the upright member 51 by means of bolts 108 and 109 for holding the housing in place.

Commonly connected between the leg of the frame member 57 between the upright members 50 and 51 and the leg 51 is a bearing bracket 110 best shown in Figures 5 and 6. Bolts 111 serve for holding the bearing bracket to the upright member 51 while a bolt 112 holds such member to the frame piece 57. Within the upper body of the bracket 110 is a horizontal bearing 110a for supporting an end of the main cam shaft 113. The opposite end of the cam shaft 113 is supported in a bracket 114 similar to the bracket 110 and which is held in position at the opposite side of the machine by bolts 115 and 115a. A bearing 116 within the upper portion of the bracket 114 serves as a journal for an end of the cam shaft 113. Adjacent to the outer side of the frame member 51 and keyed upon the shaft 113 to rotate therewith is a spur gear 118. Meshing with the spur gear 118 as a driving means therefor is a smaller gear 119 which is keyed to the main drive shaft 83.

A face cam plate 120 is keyed to the main cam shaft 113 for driving two cam follower plates 121 and 122. A more detailed description of the cam follower plates 121 and 122 will be given later together with an explanation of the manner of operation of certain parts of the machine which they drive. Displacement of the follower plate 121 along the shaft 113 and away from the cam 120 is prevented by a collar 123. A collar 124 precludes a similar displacement of the follower plate 122 from the opposite face of the cam 120.

A face cam plate 125 is keyed to the shaft 113 adjacent to the bearing bracket 114. Intermediate the bearing bracket 114 and the cam plate 125 is a cam follower 126 for cooperating with the cam plate 125. For preventing longitudinal movement of the cam 125 and the cam follower 126 are collars 127 and 128. A set screw 129 holds the collar 127 in place. Within the right face of the face cam plate 125 is an irregular eccentric groove 130 best shown in Figure 9. A roller bearing 131 operates within the groove 130 and is secured to the cam follower plate 126 by means of a pin 132.

Within the cam follower plate 126 is a vertical slot 133 for the reception of the shaft 113 to adapt the plate for reciprocation as it is propelled by the roller 131 within the groove 130.

A beveled gear 134 is secured to the cam shaft 113 by means of a set screw 135. The beveled gear 134 meshes with a second beveled gear 136. Gears 134 and 136 are shown in a different view in Figure 6. In the latter named view there will be noted above the pinion 136 a gear 137 which meshes with an idler gear 138 for driving a third gear 139. A shaft 140 journaled within the bearing 66 carries the gears 136 and 137 at its lower end. A stub shaft 141 provides a journal for the idler gear 138, while a shaft 142 commonly journaled in the bearings 67, 78, and 56 carries the gear 139.

Resting upon the top of the bearing 67 is a sleeve 143 which is free to turn independently of the shaft 142 and has keyed thereto for common rotation a star cam 144. About the periphery of the cam 144 are alternately arranged arcuate sections 145 and inwardly extending slots 146. At the ends of the slots 146 and the arcuate sections 145 are points 147 and 148.

Above the bearing 66 to rest thereon and keyed to the shaft 140 is a Geneva cam plate 149. The plate 149 is circular and is disposed within a horizontal plane common to that of the body of the star cam 144. A narrow flange 150 circumscribes the lower edge of the main body 151 of the cam to extend therefrom as a section 152. Within the cam section 152 is a slot 153 with its major dimensions arranged radially of the vertical axis within the shaft 140. The slot 153 is for slidably carrying a pin 154 which carries a roller bearing 155 upon its upper end. A plate 156 is free to slide along the lower face of the cam section 152 and has an aperture 157 for receiving the lower end of the stem 154 which is threaded for the reception of a bolt 157a for holding the plate 156 in place. Above the cam section 152 is a sleeve 158 for measurably spacing therefrom the roller bearing 155.

Above the Geneva cam plate 149 is a stationary cam plate 159 which presents a groove 160 in its lower face and which groove is of substantially the same width as is the roller 155 and which is for propelling the roller 155 axially of the Geneva cam 149 as the latter is rotated with the shaft 140. A bearing 161 within the cam plate 159 provides for free rotative movement of the shaft 140 therein while a bar 162 held between the frame members 51 and 52 by means of bolts 163 prevents rotation of the plate 159.

In Figure 5 it will be noted that the contour taken by the groove 160 for the greatest portion thereof is of a radius generated about the axis within the shaft 140. Between the points 164 and 165, however, the groove 160 is generated about a point more distant therefrom than the shaft 140.

Upon the upper end of the shaft 140 is a sprocket wheel 166 for driving a chain 167. The opposite and forward end of the chain 167 drives a sprocket 168 which is upon a vertical shaft 169 cojournaled within the bearings 71 and 79. Intermediate the two sprockets 166 and 168 is an idler sprocket 170 to prevent flapping of the chain 167 due to vibration of the machine. The sprocket wheel 170 is supported upon a bracket 171 which is secured to the cross frame member 163 by means of bolts 172.

Figure 10:
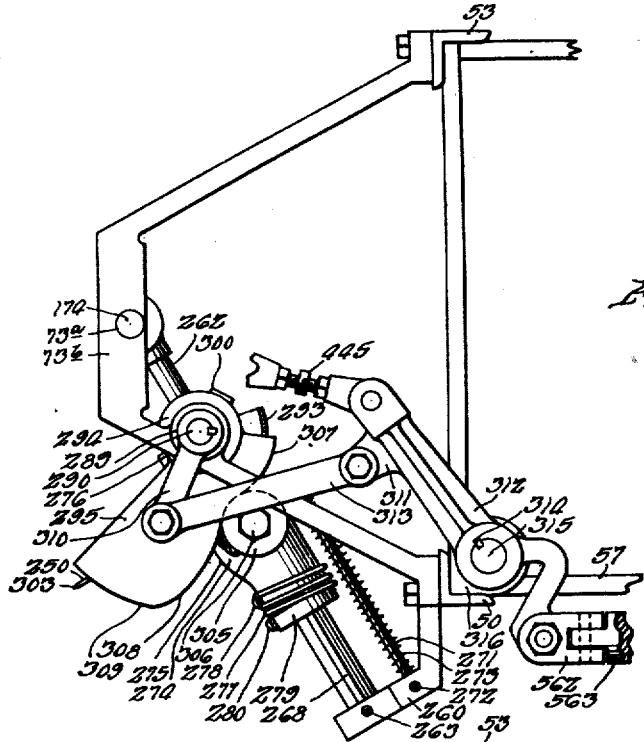
Figure 10 is a plan view of a bobbing mechanism taken at the line 10—10 of Figure 2.
Figure 11:
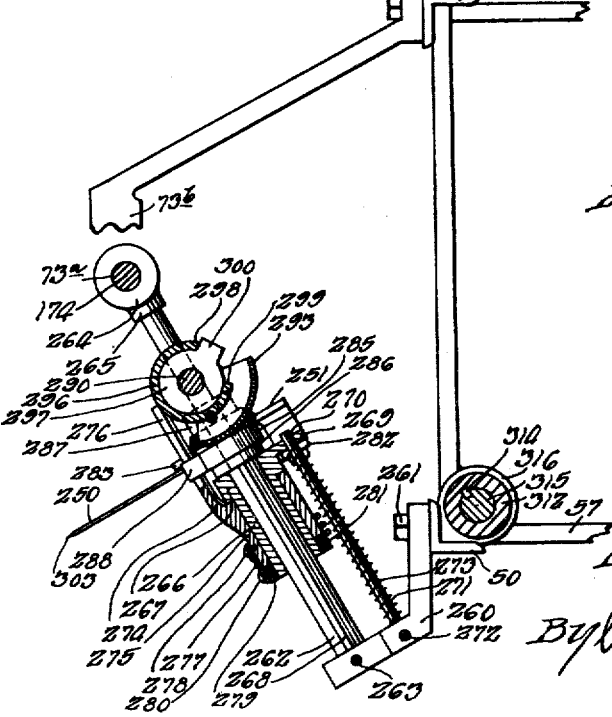
Figure 11 is a sectional view of the bobbing mechanism illustrated in Figure 10.

Figures 5 and 6 taken together illustrate a Geneva cam arrangement for driving a sleeve 173 intermittently about a rod 174 which is held stationarily within the bearing 73 and a bearing 73a, thereabove in a trapezoidal frame piece 73b (see Figures 10 and 11). Keyed to the sleeve 173 is a star cam 175 having arcuate sections 176 and grooves 177 arranged alternately about its periphery. There are six slots and six grooves in the present form of the invention but this number is, of course, not inflexible. At the side of each slot 177 are points 178 and 179.

Keyed to the shaft 169 is a Geneva cam plate 180 having a raised portion 181 with an arcuate section 182 of the same radius of the arcuate sections 176 of the star cam 175, and a concave arcuate section 183. The sections 182 and 183 enjoin at the points 184 and 185. Supported at the point of the lower projecting portion 186 of the cam 180 is a roller bearing 187. A stub shaft 188 provides a journal for said roller bearing.

The feed turret

The lower end of the sleeve 173 rests rotatively upon the top of the bearing 73. In Figures 1 and 2 it will be noted that at the top of the sleeve 174 there is a hub 189 of a feed turret 190. A set screw 191 secures the hub 189 and the sleeve 173 together for common rotation. Radiating from the hub 189 are spokes 192 in support of a peripheral rim 193 (see Figure 13). The configuration taken by the rim 193 is hexagonal, there being a bearing 194 at each of the vertexes of the rim. The bearings 194 are rectangular in cross section and are open at the outermost side so that stems 195 of the same rectangular cross section may be inserted therein in a manner to adapt them for vertical reciprocation. After the stems 195 are inserted into the bearings 194, plates 196 may be placed over the open sides of the bearings to be there held by means of bolts 197 (see Figure 1).

The lower end of each of the stems 195 is apertured for the reception of a bolt 198 so that straps 199 having journals 200 for roller bearings 201 may be attached thereto. The upper body of the stems 195 configure a feed cup 202 having side pieces 203 and a back piece 204.

Figure 12:
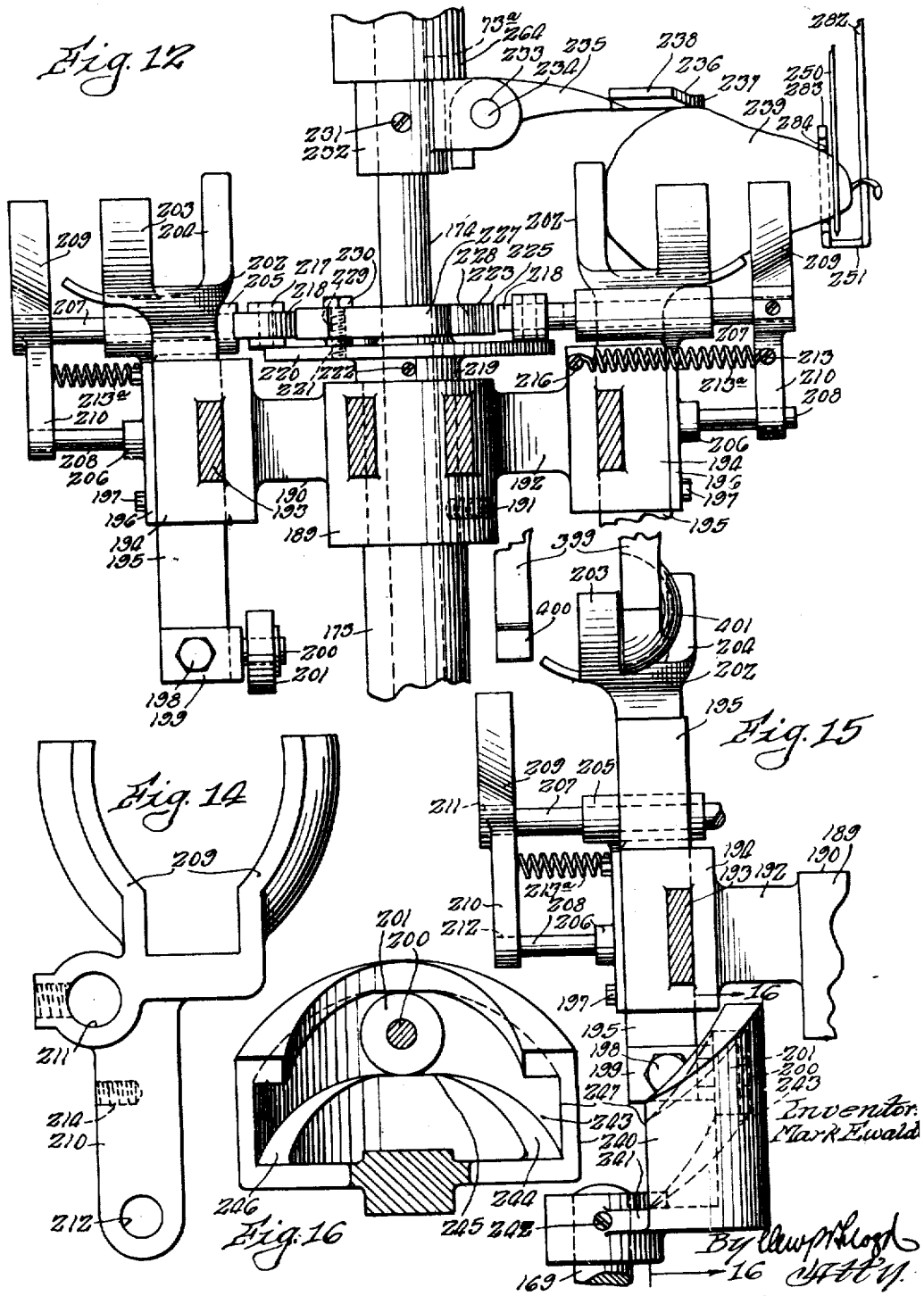
Figure 12 is a fragmentary sectional view of a feeding mechanism taken at the line 12—12 in Figure 13.

Within the sides of the bearings 194 are horizontal bearings 205 extending radially of the turret 190. In a centrally drilled and tapped boss 206 is anchored a stem 208 to project slidingly into an aperture 212' formed within the lower body of a stock 210 from which fingers 209 extend upwardly. A second stem 207 is set within an aperture 211 at the upper end of the stock 210 to extend slidingly into the bearing 205. A contraction spring 213a which is attached to each of the pairs of fingers 209 by means of a set screw 213 set within the stock 210 at a threaded recess 214 and having the opposite end enchored at 216 within a side of its respective bearing 194 constantly urges the fingers 209 toward the fruit cup 202. (Figures 12, 14 and 15 illustrate the structure just described.)

Figure 13:
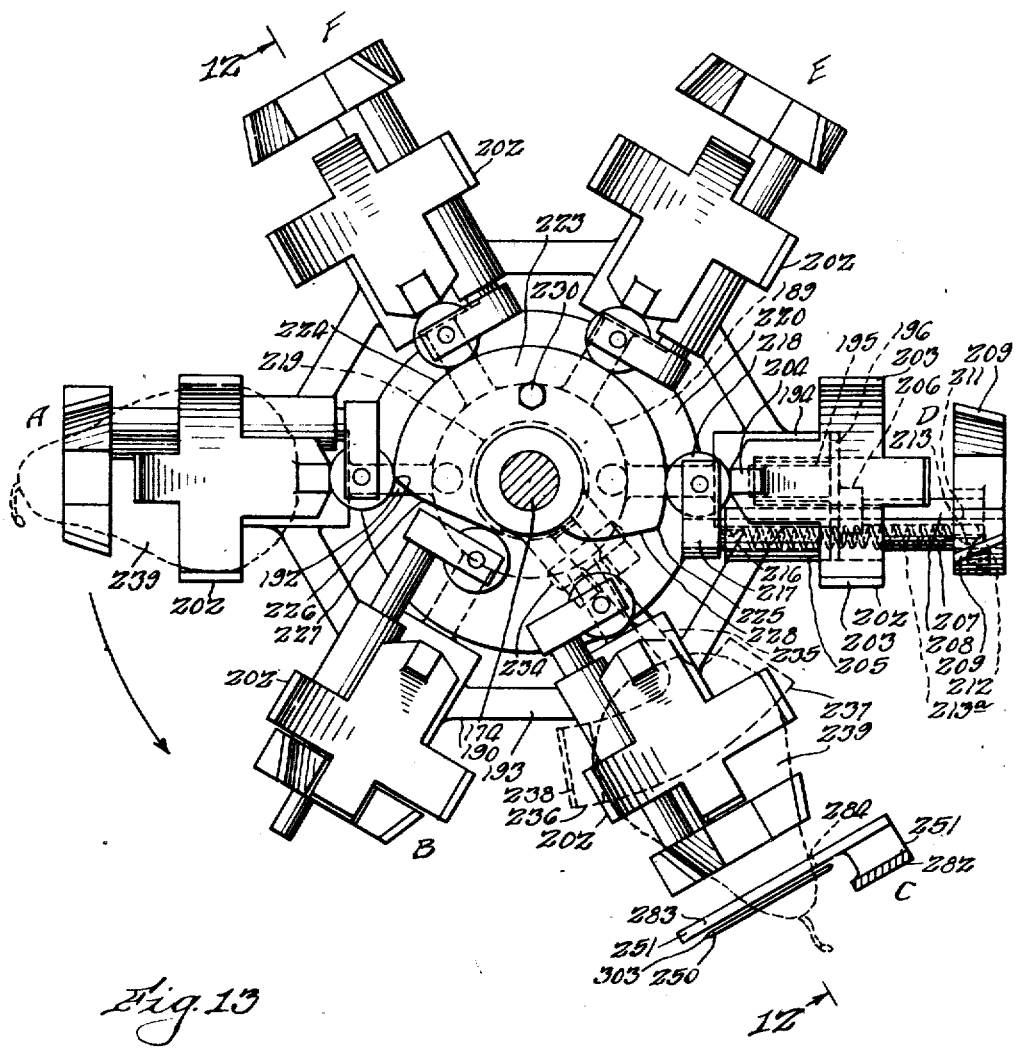
Figure 13 is a plan view of a feed turret taken on the line 13—13 of Figure 2.

In Figure 13 there will be noted upon the inwardly disposed end of each of the stems 207 a horizontally placed arm 217 which is bifurcated to hold a roller bearing 218 in a manner to rotate about a vertical axis. Immediately above the hub 189 of the turret 190 is a collar 219 having a flange 220 with a threaded aperture 221 and held in a selected fixed radial position relative to the shaft 174 by means of a set screw 222. Above the flange 220 is a cam plate 223 having an arcuate section 224 with terminals 225 and 226, and other cam sections 227 and 228. An aperture 229 in the cam plate 223 coincides with the threaded aperture 221 in the flange 220 so that a bolt 230 may commonly engage the flange 220 and the cam plate 223 for holding the two members in fixed assembly. Shifting of the position of the cam plate 223 about the shaft 174 is accomplished by loosening the set screw 222 and retightening said set screw after a selected position is attained.

Above the cam 223 and fixed to the shaft 174 by means of a set screw 231 is a collar 232 having a pair of apertures 233 for the common reception of a pintle member 234 which carries an arm 235. Projecting downwardly from the arm 235 is a lug 236 to press against the collar 232 and prevent downward displacement of the arm 235 beyond a desired position. Depending from the extended end of the arm 235 is a plate 236 having a horizontally disposed section 237 and an upwardly turned section 238. The arm 235 is of such a length as to place the plate 236 above the path of a fruit 239 as it is carried about the shaft 174 by a fruit cup 202.

Figure 4:
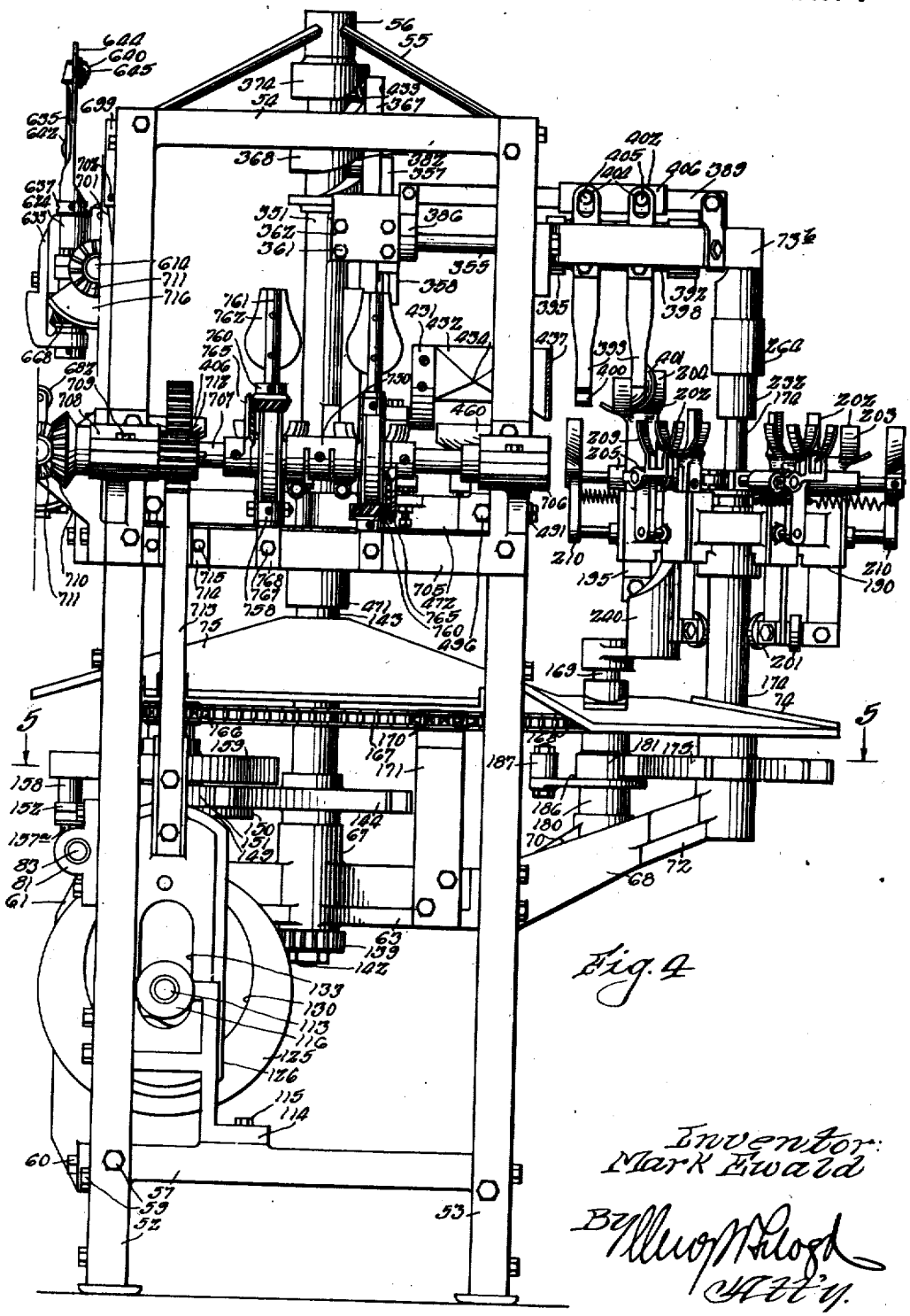

In Figures 4, 15 and 16 there will be noted at the top of the shaft 169 a curved cam plate 240. The plate 240 is offset from a shank 241 which engages the upper extremity of the shaft 169 to be held in a selected radial position thereto by means of a set screw 242. Within the concave surface of the cam plate 240 there is formed a groove 243 having an entrance 247, an inclined section 244, a flat elevated section 245 and a declined section 246. The groove 243 is of a width to accommodate the roller bearings 201.

Power for driving the feed turret 190 is received from the pulley 90 and the main drive shaft 83 which may be driven from any convenient source of power to rotate in a clockwise direction as viewed from the right side of the machine. When it is desired to connect the shaft 83 to the pulley 90 the operating shaft 91 is given a turn in a clockwise direction with reference from its handle bearing end to remove the lug 99 from the side of the aperture 100 against which it has been pressed by the effort of the spring 87, and to displace the adjoined ends of the link 98 and the lever 97 downwardly so that the spring 87 may urge the flanged collar 85 to the right, Figure 7, to compress the friction disc 89 therebetween and the adjacent face of the pulley 90. Thereafter the grooved collar 85 is caused to rotate with the pulley 90 while the bushing 104 slides within the groove 86. When the drive shaft 83 is so set in motion the gear 119 turns the gear 118 in a clockwise direction as viewed from the right side of the machine whereby the pinion 136 and the gear 137, as viewed from above, are rotated in a clockwise direction through the agency of the beveled gear 134. The shaft 140 and the sprocket wheel 166 are also rotated in a clockwise direction whereby the sprocket wheel 168 and the shaft 169 are caused to rotate in a like direction.

When the cam 180 and the cam plate 175 are in the position shown in Figure 5, the upper body 181 of the cam 180 is within the arcuate section 176 of the cam 175 to prevent the latter named member from rotating. Continued clockwise movement of the cam 180 carries the point 184 to a position on a center line between the shafts 169 and 174. With the upper body 181 stationed in this position said body will no longer obstruct turning of the cam 175 for the cam point 178 which is then opposite to a central position within the arcuate face 183 may then be moved toward that face. Simultaneously with the positioning of the point 184 upon the center line between the shafts 169 and 174 the roller bearing 187 makes entrance into the groove at position "X" which registers with the moving path thereof and to press along the side of the groove to rotate the cam 175 in a counter-clockwise direction. When the groove at "X" is so engaged it is moved to position "Y." Incident to the slot 177 arriving at position "Y" the roller bearing 187 makes an exit therefrom concurrently with the entrance of the point 185 into the succeeding arcuate section 176 at the point 178. Thus it has been shown that the cam plate 175 is rotated through one-sixth of a revolution each time that the cam 180 makes a complete revolution.

Movement of the cam 175 is had only while the roller bearing 187 is within a groove 177, the cam 175 being held stationary while the raised portion 181 is within an arcuate section 176. It is evident that the sleeve 173 and the feed turret 190 which are driven by the cam 175 will be caused to rotate intermittently, the stationary period of the turret being for a greater period of time than the rotary period.

Stations designated by the letters A, B, C, D, E, and F will be noted in Figure 13. The arcuate section 234 of the cam 223 is of such an extent and is in such a radial position relative to the shaft 174 that the fruit cups which are at the stations D, E, F, and A, will have their respective roller bearings 218 in contact with such arcuate section so that the stems 207 will be displaced outwardly of the feed turret against the urge of the contraction springs 213 and so that the fingers 209 will be displaced from the cup side pieces 203. While the fingers 209 are so displaced from the fruit cups a fruit may lie loosely within the fruit cups. Therefore, at the stations E, F, and A, a fruit may be easily placed within the fruit cups with the stem bearing end extending outwardly from the turret.

The Geneva cam movement for the turret is designed so that each movement given to the turret will be one-sixth of a revolution to remove the feed cups from one station to the next where it will be permitted to remain until a following movement is imparted to the feed turret.

The fruit 239 which has been placed within the fruit cup at station A when transferred from station A to station B by a movement of the fruit turret is pressed by the fingers 209 because of the urge of the spring 213 when the roller bearing 218 pases along the camming surface 227 to permit the fingers to be displaced inwardly of the feed turret. Incident to the next intermittent movement of the feed turret and the transferring of the fruit from station B to station C, the fingers are allowed to remain in their inwardly displaced position against the fruit and the fruit is carried against the upwardly displaced portion 238 of the plate 236 to displace said plate upwardly as it slides upon the fruit. When the fruit has reached station C it will be beneath the flat section 237 of the plate 236. It is at station C that the stem bearing end is bobbed from the fruit by means of a blade 250 which is a part of a bobbing mechanism to be described in detail later. Associated with the blade 250 is a holder member 251 for engaging the fruit incident to the bobbing operation to assist in holding the fruit within the feed cup and thereby preventing it from being displaced from the cup when the blade 250 is passed therethrough. It is the function of the weight 236 to assist the fingers 209 and the holding member 251 to retain the fruit stationarily within the cup during the bobbing operation. Because of the fact that the fruit is to be engaged by other apparatus at the following station that it is important that the fruit be not skewed from a selected seated position within the feed cup by the bobbing mechanism.

Concurrently with the advancement of the feed cup 202 from station C to station D subsequent to the bobbing operation, the fruit is passed from beneath the weight 236 and the roller bearing 218 is passed along the camming surface 228 to displace the fingers 209 away from the fruit cup so that the fruit will be lying freely within the cup when station D is reached. While the fruit is lying freely within the cup at station D, it is possible for other apparatus, later to be explained, for abducting the fruit inwardly of the machine, to easily engage it.

After the fruit has been carried from the fruit cup at station D, the next intermittent movement of the turret carries it to station E where a different fruit may be placed therein and the cycle repeated.

The cam 240 which is mounted upon the shaft 169 is rotated uniformly in a clockwise direction as viewed from above. The radial position of the cam 240 with reference to the shaft 169 is such that the entrance 247 to the groove 243 will be presented to a roller 201 when the fruit cup with which it is associated is advanced to station "D." While the roller 201 is held stationary at station D by the Geneva cam mechanism hereinabove described, the cam 240 continues to rotate and elevates the fruit cup while the roller 201 is traversed by the camming surface 244. The fruit cup is held in the elevated position for a short period of time while the flat camming surface 245 is passed beneath the roller and thereafter the feed cup and roller 201 are depressed while the camming surface 246 traverses the roller. It is while the feed cup is held in the elevated position by the flat camming surface 245 that the splitting carriage, later to be described, engages the fruit for abducting it from the feed cup.

The bobbing device

Depending from the upper part of the angle frame member 50 is a bracket 260 which is secured to the frame member by bolt 261 (Figures 10 and 11). The extended end of the bracket 260 is apertured for the support of one end of a slider rod 262 which is tightly held within the end of the bracket by means of a set screw 263. Fixedly attached to the shaft 174 is a collar 264 with a socket 265 for supporting the opposite end of the rod 262.

The front of the machine is that side at which the feed turret is supported and the directions right and left hereinafter will be taken with reference from the front of the machine. Direction of rotation will be taken with reference from above the machine unless otherwise noted.

Reciprocally mounted upon the rod 262 is a sleeve 266 having a flange 267. There is within the bore of the sleeve 266 a groove (not shown) for receiving the spline 268 which extends along the right top portion of the rod 262. Rotation of the sleeve 266 about the rod 262 is thus precluded. A section 269 of the flange 267 projects backwardly where it is apertured at 270 for the reception of an end of a rod 271. The opposite end of the rod 271 is tightly held within an aperture within the bracket 260 by means of a set screw 272. An expansion spring 273 is upon the rod 271 between the projected portion 269 of the flange 267 and the bracket 260. When the sleeve 266 is retracted to the right along the rod 262 against the urge of the spring 273, the left end of the rod 271 projects further through the aperture 270.

Rotatively placed upon the sleeve 266 is a fork-like member 274 having a shank 275 and bifurcated parts 276. There is a coiled spring 277 which has an end anchored to the shank 275 by means of a set screw 278 and the other end connected to a collar 279 by means of a second screw 280. A torsional force is exerted upon the member 274 by the spring 277 tending to rotate it clockwise about the sleeve 266 as viewed from the right end of the sleeve. Longitudinal movement of the member 274 is prevented by the coaction of the flange 267 and the collar 279, the latter engaging the sleeve 266 by means of a set screw 281.

Depending downwardly from the boss 260 is a strap bracket 282 (Figures 1 and 11) which carries at its lower end an upturned section 251 hereinabove mentioned in connection with the feed turret and containing a notch 284. The plane of the upturned section 251 is tangential to the axis within the rod 170. For spacing a pinion 285 from the flange 267 is a collar 286 which prevents a movement of the pinion 285 to the right along the rod 262. Upon the other side of the pinion 285 is a collar 287 for preventing movement of the pinion 285 to the left. Projecting from the pinion 285 is a lug 288 for slidably fitting into the notch between the two fork members 276.

Supported within a vertical bearing 289 within the frame member 73b is a short shaft 290. A bolt 291 in the lower end of the shaft 290 and a washer 292 thereabout supports a segmental gear 293 upon the shaft 290 in a rotative manner. The teeth of the segmental gear 293 mesh with the teeth in the gear 285 for turning the latter named gear. Above the gear 293 and keyed to the shaft 290 is the shank 294 of a cam plate 295. A down turned flange 296 from the shank of the cam 295 circumscribes an upturned collar 297 of the segmental gear 293 excepting for an opening having edges 298 and 299 for the reception of a lug 300 projecting from said upturned collar. Carried in the upper side of the flange 267 is a roller bearing 305 upon a bolt 306. The roller 305 is for coacting with the camming surfaces 307, 308, and 309, of the plate cam 295.

Depending from the lower fork member 276 is a lug 301 to which the blade 250, heretofore mentioned in connection with the feed turret and having a sharpened edge 303, is attached by means of rivets 304. The blade 250 is for rotating with the member 274 and to pass within a plane very close to the upturned section 251 in parallelism thereto. The plane traversed by the blade 302 is between the upturned section 251 and the downwardly extending stem of the strap bracket 282.

Above the bearing 289 there is keyed to the shaft 290 a short arm 310. For connecting the extended end of the arm 310 to an ear 311 upon a lever 312 is a link 313. A key 314 serves for non-rotatively attaching the lever 312 to a vertical shaft 315 disposed within the angle of the upright frame member 50. Support for the vertical shaft 315 is provided within a bearing block 316, and in a bearing 317 formed within the frame member 54 (see Figure 5).

Attention will next be directed to the cam follower 121 shown in Figures 2, 3, and 17, and an arm 318 projecting forwardly therefrom. An aperture 319, oblong in shape and with its greater dimension in a horizontal plane, is within the cam follower 121. This aperture is of a width to receive the main cam shaft 113 and of a length to accomodate the horizontal reciprocation imparted to the cam follower 121 by a roller bearing 320 which is carried upon the face of the cam follower adjacent to the cam 120 upon a post 321. The roller bearing 320 rides within a groove 322 within the right face of the plate cam 120, Figure 3, the sides of the groove 322 imparting reciprocal movement to the roller and the cam follower 121.

In the opposite face of the cam plate 120 from the face bearing the groove 322 is a groove 323 congruent to and axially alined with the groove 322. More will later be said of the groove 323 and a roller bearing 324 which rides therein for reciprocally moving a cam follower 325 in a vertical plane and in connection with the peeling device.

Projecting downwardly from the right side of the cross brace member is a guide piece 326 with a groove 327 therein for holding the arm 318 of the follower plate 121 in lateral alinement. An apertured ear 328 supports an end of a connecting link 329 by means of a bolt 330. The opposite end of the link 329 is connected to the extended end of an arm 331 by means of a bolt 332. Connection is had with the pivotal end of the arm 331 and the shaft 315 at a point below the bearing 317.

After the machine is set in motion, the main cam shaft 113 which will be rotated in a clockwise direction, with reference from the right side of the machine, will first move the roller bearing 320 and the cam follower 121 forwardly where it will be maintained for a period of time and then displace the roller and the cam follower rearwardly to complete the cycle. When the cam follower 121 is moved forwardly, the link 329 and the arm 331 cause the shaft 315 to turn in a counter-clockwise direction and to similarly turn the lever 312. This counter-clockwise movement of the lever arm 312 is enacted while there is a fruit at station C within the feed turret as illustrated in Figure 13. When the cam plate 295 is in the position shown in Figure 10, the roller bearing 305 is opposite the camming surface 307 as it is urged by the spring 273. While the device is in this position the upturned section 251 carrying the notch 285 will be in position against the fruit 233. Also the edge 298 of the notch within the flange 296 will be against the lug 300 projecting from the collar 297 of the segmental gear 293. A further counter-clockwise movement of the shaft 315 when the parts are arranged as described, will cause the notch side 298 to press against the lug 300 and to rotate the segmental gear 293 and the pinion 285 to cause the member 274 and the blade 250 which is attached thereto to rotate, the member 274 being caused to rotate in a counter-clockwise direction as viewed from the right end of the rod 262 to carry said blade through the stem bearing end of the fruit. The notch 284 within the upturned section 251 is of such a size that it will slide axially over the end of the pear only a desired amount and upon the striking of the sides thereof with the fruit will stop the leftward movement of the sleeve 266 and its appendages rather than the contact of the roller bearing 305 with the camming surface 307. It is only in such a case where an extra small fruit might be placed within a feed cup that the movement of the bobbing device to the left would be stopped by the roller bearing 305 striking the camming surface 307.

As soon as the blade 250 has been moved downwardly to sever the stem bearing end from the fruit, the cam follower 121 will have reached the foremost of its reciprocal limits where it will be maintained until the roller 320 is traversed by the section of greatest radius of the cam groove 322 at which time it will be displaced rearwardly. Rearward displacement of the cam follower 121 causes the lever 312 to rotate in a clockwise direction to cause the cam plate 295 to rotate in a counter-clockwise direction. While the camming surface 307 is being thus carried past the roller 305 the notch side 298 is being retracted and the lug 300 is being retracted along with the notch side 298 by the urge of the tortional spring 277 which rotates the pinion 285 in a clockwise direction with reference from the right side of the device. By the time the roller 305 is opposite to a position between the camming surfaces 307 and 308 as illustrated in Figure 10, the blade 250 which has been rotated clockwise along with the pinion 285 is removed from the engagement with the fruit. Thereafter incident to further clockwise movement of the lever 312 the camming plate 295 is turned further counter-clockwise whereby the sleeve 266 and its appendages are propelled to the right against the urge of the spring 273 by the camming surface 308 which bears along the roller 305. After the camming surface 306 has traversed the roller 305 and the roller rests upon the camming surface 309, the bobbing device is entirely displaced from the fruit so that no interference will be had with the intermittent movement of the feed turret which now takes place.

After a new fruit has been delivered to station C, the shaft 315 is again given a counter-clockwise movement to rotate the cam 295 clockwise to displace the camming surfaces 308 and 309 from the roller 305 to permit the bobbing device depending from the sleeve 266 to be moved to the left under the impetus of the spring 273 to engage the fruit with the notch 284. While the camming surfaces 308 and 309 are being passed by the roller 305 the notch side 299 is being removed from the lug 300 and no turning of the gear 293 occurs. Thus the blade 250 is not rotated from its normal horizontal position until after the notch 284 is in engagement with the fruit and at which time the notch edge 298 comes in contact with the lug 300 for rotating the blade in the manner heretofore described.

It is the purpose of the tortional spring 277 to move the blade 250 laterally from the severed face of the stemmed fruit incident to the cutting of the stem therefrom and before the bobbing mechanism is moved axially of the fruit so that the blade will be slid therefrom and there will be no tendency to drag the fruit from the feed cup because of the vacuum between the flat surfaces of the blade and fruit. The sides of the notch 284 which engage the fruit while the end is being snipped therefrom materially assists in retaining the fruit in a fixed position in the feed cup concurrently with the stemming operation.

The splitting mechanism

Above a hub 350 of a fruit turret, later to be described, there is shown a sleeve 351 upon the central vertical shaft 142 (see Figure 18). At the upper end of the sleeve 351 and integral thereto is a boss 352 having a bearing 353 therein (Figures 19 and 20), for the support of a rod 354. A recess (not shown) in the opposite side of the boss 352 serves as a bearing in which an end of a rod 355 is rotatively supported. Rods 354 and 355 project forwardly to be supported in the front side of the frame member 73b, in the manner shown in Figure 21.

A vertical groove 356 within the front face of the block 352 serves as a channel in which a rod 357 may be guided for vertical reciprocation. Above and below the block 352 are brackets 358 which are held in place to the block by bolts 359. A groove 360 in each of the brackets 358 coacts with the groove 356 in the block or boss 352 to form a bearing for the reciprocal rod 357.

Bolted to the left side of the block 352 by means of bolts 361 is a plate 362 having a section 363 projecting to the right against a face 364 provided in the block 352. A notch 365 within the body of the block 352 coacts with the notch formed between the projection 363 and the main body of the plate 362 to form a bearing 366 in which a rod 367 may be confined for vertical reciprocation.

Immediately above the sleeve 351 is a circular cam 368 having a groove 369 with an inclined camming section 370, an elevated section 371, and a declining camming section 372, the latter being shown in Figure 2. Between the two sections 370 and 372 at their lower ends is a camming section 372a. A set screw 373 secures the cam 368 to the shaft 142 for common rotation of the two members.

Above the cam 368 is a cam somewhat similar which is designated by the number 374. A groove 375 circumscribes the cam 374. The lower side of the groove 375 embodies a camming surface 376 of a low elevation, an inclined surface 377 leading from the section 376 to a section 378 of a higher elevation and a section 379, Figure 2, leading from the section 378 to the section 376. The cam 374 is also caused to rotate in a clockwise direction with the shaft 142 because of a set screw 380.

A stub shaft 381 projecting from the upper extremity of the rod 357 supports a roller bearing 382 within the groove 369 so that the cam 368 may reciprocate the roller 382 and the rod 357 vertically when the shaft 142 is rotated. Projecting forwardly from the reciprocal stem 357 is a pin 383 for rotatively carrying a rectangular block 384. Pin 383 projects outwardly of the groove 356 within the block 352 in a manner to be free for reciprocation between the limits established at the upper and lower faces of said block where the bracket 358 are anchored.

Connected to the rod 355 by means of a key 385 is a lever 386 (Figures 19 and 20). One end of the lever 386 contains a clot 387 for carrying the block 384 in a manner that the block may slide back and forth therein. The opposite end of the lever 386 has secured thereto by a bolt 388 an end of a horizontal roller bar 389. Upon the opposite end of the rod 355 is connected an arm 390 to the extended end of which is held the opposite end of the roller or slider bar 389 by means of a bolt 391 (see Figure 21).

Slidably mounted upon the two rods 354 and 355 is a splitting carriage 392. Figures 20, 21, 22, 23, and 24 should be referred to conjointly in the description immediately following of the parts comprising the splitting carriage 392. Slidably mounted in opposed relationship on the two rods 354 and 355 are sleeves 393 and 394. Carriage end pieces 395 and 396 are suitably apertured to be telescoped onto opposite ends of the sleeves 393 and 394 to hold the parts in a fixed assembly which is free to slide longitudinally of the rods 354 and 355.

Upon the sleeve 394 and intermediate the end pieces 395 and 396 are segmental gears 397 having integral collars 398 which entirely fill the space between the two end pieces. Depending downwardly from the two collars 398 are clamp arms 399. The end of the rearmost clamping arm 399 terminates in a forked member 400 while the foremost arm terminates in a scoop 401. To the left side of the collars 398 are attached brackets 402 by means of bolts 403. In the upper parts of the brackets 402 are apertures 404 for loosely containing ends of short rods 405. Commonly carried upon the opposite ends of the rods 405 is a shoe 406 having a groove 407 which fits about the slider bar 389 in a manner adapting said shoe to slide along the bar. Springs 408 press against the brackets 402 and the back of the shoe 406 to hold the latter named member in place against the slider bar. In the upper sides of the collars 398 are apertured bosses 409 into which bolts 410 are anchored for holding roller bearings 411 which are adapted for rolling along the side of the slider bar 389 opposite to the shoe 406.

About the sleeve 393 for meshing with the gears 397 are gears 412 having collars 413 similar to the collars 398. Depending from the backmost collar 413 is a clamp member 414 having a forked end 415 opposite to and complemental to the forked end 400 of the clamp member 399. From the collar 413 of the foremost gear 412 there depends a clamp arm 414 having a scooplike end 417 opposite to and for coacting with the scooplike end 401 of the clamp arm 399. The clamp arms 399 and 414 cooperate in a manner for lifting a fruit from a feed cup at station D in a manner presently to be described.

Near the lower end of the sleeve 351 is a platelike section 418 having a section 419 projecting forwardly from a vertical center central portion. The section 419 is not as high as the plate 418 nor is it as wide so that when a bearing block 420 is carried against the face 421 of the forwardly projecting section 419 to be there held by the bolt 422, an entrenchment 423 will be formed between the plate 418 and the block 420 and above the projecting section 419. Since the width of the block 420 is coextensive with the width of the plate 418, there will be vertical grooves 424 and 425 at the two lateral sides of the forwardly projecting sections 419. A pillow block 426 is held to the top of the bearing block 420 by means of bolts 427 to form bearings 428 into which stems 429 may be held for rotation. Upon the back ends of the stems 429 are pinions 430 for operating within the entrenchment 423.

Wings 431 are turned at right angles to the stems 429 for the support of leaflike members 432. Screws 433 provide attaching means between the leaf members 432 and the wings 431. Four triangular facets in the opposite faces of the leaf-like members 432 terminate in a point 434 which is raised slightly from the body of the leaves. Set within each leaf member in a horizontal plane forwardly of the point 434 is a fin member 435. A blade 436 having a vertical sharpened edge 473 projects forwardly from the left member 432, there being a notch 438 where the blade 436 joints said left member so that the forward edge of the right member 432 may set therein in a manner to be flush with the right face of the blade. Thus when the two leaf members 432 are together as shown in Figure 19, a cuneiform configuration is established between the edge 437 of the blade and the two points 434 upon the leaf members 432.

At the top of the reciprocal bar 367 is a roller 439 which rides within the groove 375 of the circular cam 374. Attached to the lower end of the rod 367 by means of bolts 440 is a rack 441 which meshes with the pinion 430 which is at the right (Figure 20). A block 442 measurably spaces a second rack 443 from the rack 441 and a bolt 444 holds the three members in assembly. The gear 430 to the right is rotated by the rack 443 in a direction depending upon whether the rod 367 is being raised or lowered.

In Figure 21 there will be noted an adjustable link 445 as a means for operatively connecting the end of the lever 312 to the splitting carriage 392 at the end piece 296. When the lever arm 312 is oscillated the splitting carriage 392 is moved forwardly and backwardly along the rods 354 and 355 in a selected sequence with the operation of the leaf members 432 and of the feed turret 90.

When a feed cup is moved to station D to hold a fruit loosely therein, the lever 312 is given a counterclockwise movement by the shaft 315 to shift the splitting carriage 392 forwardly. While the splitting carriage 392 is being moved forwardly the cam 368 is rotated in such a position as to hold the roller bearing 382 at the lowermost of its reciprocal positions. When the roller bearing 382 and the rod 357 are forced downwardly the block 384 which pivots about the post 383 slides within the groove 387 pursuant to rotating the lever arm 386 in a clockwise direction with reference from the front of the machine. Incidentally the rod 355 rotates along with the lever 386 to rotate the lever 390 in the same direction. It is in this manner that the slider bar 389 is moved clockwise about the axis within the rod 355 to press against the rollers 411 to pivot the collars 398, the gears 397 and the gears 412 which mesh with the first named gears to spread the clamp members 399 and 414. With the clamping members so held apart, there is no interference with their forward movement as they are slid into a position about the feed cup at station D. After the clamping members 414 and 399 are hovered about the feed cup the cam 368 continues to rotate in a clockwise direction as viewed from above to elevate the roller 832 along the camming surface 37? whereby the lever 386, the rod 355 and the lever 390 are rotated in a counter-clockwise direction to close the clamping members about the fruit. The forklike jaws 400 and 415 clamp the fruit slightly to the rear of the cup members 203 while the scooplike jaws 401 and 417 close about the heel of the fruit which is between the side cup members 203 and the cup member 204 (see Figure 4).

After the fruit has been so engaged by the clamping members of the splitting carriage, the roller 201 of the feed cup is lowered by the cam 240 to leave the fruit suspended only by the fruit clamps of the fruit carriage. Thereafter and while the bar 389 is maintained in the counter-clockwise direction to hold the clamping members in contact with the fruit, a clockwise movement is imparted to the lever arm 312 by the driving mechanism heretofore described in connection with the bobbing device and to propel the splitting carriage 392 backwardly into the machine.

While the arms 386 and 390 and the bar 389 are rotated in a counter-clockwise direction to impinge the clamping members against the fruit, the shoe 406 slides along the bar 389 concurrently with the moving of the splitting carriage.

Springs 408 provide a flexible means for engaging the fruit clamps with the fruit. When the fruit clamp members are brought in contact with a fruit to be carried thereby and by displacement of the slider bar 389 in a counter-clockwise direction about the rod 355, such contact is had by pressing the springs 408 against the brackets 402 about the apertures 404 to pivot the collars 398 and 413. After the clamping members have been stopped by the fruit there may be a further displacement of the slider bar 389 by further compressing the springs concurrently to further projecting the rods 405 through the apertures 404. Greater compression of the springs 408 provides for a tighter gripping of the fruit but does not force the clamping members into the fruit.

When the fruit which is being carried inwardly of the machine reaches the edge 437 of the blade 436 which coincides with the central axis of the fruit, the two leaf members 432 are together as shown in Figure 18. As the carriage 392 continues to move inwardly of the machine the scooplike jaws 401 and 417 at the following end of the fruit prevent it from slipping from the clamping members as it is forced past the blade. Thus the fruit is halved centrally and longitudinally with a half on either side of the leaf-like members 432. The fins 435 prevent the fruit from sliding downwardly when subsequently the clamping members are spread by the lowering of the roller 382 along the camming surface 370.

Concurrently with or shortly after the spreading of the clamping members, the rod 367 is lowered by the camming surface 377 passing beneath the roller 439. Lowering of the rod 367 forces the racks 441 and 443 downwardly to rotate the pinions 430 in opposite directions and to thereby spread the leaf-like members 432. The outer faces of the leaf-like members 432 are designed with the points 434 so that the fruit cannot flatly engage the members to create a vacuum between the fruit and members, and so that the fruit will easily fall from the members when they are spread to be disposed in a common horizontal plane. When so spread the leaf-like members 432 are at such a space interval that each of them will be above one of a pair of fruit cups 460 which are stationed between the upright members 50 and 53. A fruit turret, next to be described, serves as a base for four pairs of fruit cups. The fruit sections upon the leaf-like members are thus deposited in the fruit cups 460.

After the splitting carriage has carried a fruit past the splitting knife and has released the fruit, it is then carried forwardly by the lever 312 to engage a succeeding fruit which has been carried to the station D of the feed turret in the same manner as hereinabove described.

*The fruit turret*

In Figure 2 there will be noted at the top of a sleeve 143 a flanged collar 471 to which the base 350 of a feed turret 472 is attached by means of bolts 473. Radiating from the base or hub 350 of the turret are spokes 474 terminating in a rim 475. The spokes 474 radiate from the hub at angles of ninety degrees, there being one of a pair of lugs 476 on the rim 475 at either side of the point where a spoke joins the rim. To each lug 476 there is attached a fruit cup 460 so that there are at equal angles about the rim 475 of the turret 472 four pairs of said fruit cups.

It is at the lower end of the sleeve 143 where the cam 144 is attached that motive power for the turret 472 is obtained. In Figures 5 and 6 it will be noted that the upper body 151 of the cam 149 has an arcuate section 477 between points 478 and 479 which is of a radius equal to the radius of the concave arcuate sections 145 of the cam 144. The remainder of the periphery of the raised section 151 configures a concave arcuate section 480. As the cam 149 is rotated in a clockwise direction (Figure 5) the arcuate section 477 passes within the section 145 of the cam 144 adjacent thereto. The roller bearing 155 is moved therewith and finally is carried into the slot 146 which is at station R. Continued movement of the cam 149 then carries the roller 155 against the side of the slot 146 to rotate the cam 144 in a counter-clockwise direction. At the time the roller 155 enters the slot 146 at R, the point 478 of the upper body 151 will coincide with the center line between shafts 140 and 142 so that said upper body will be removed from the path of the cam 144 and so that the latter named member will be free to rotate in the counter-clockwise direction.

After the roller bearing 155 has entered the slot 146, the groove 160 which changes its direction at point 164, displaced the roller 155, the stem 154 and the plate 156 toward the shaft 140 until the center line between the two shafts 140 and 142 has been reached, when the roller bearing 155 is again displaced away from the shaft 140 until it emerges from the groove 146 at station T. Just as the roller bearing 155 is carried from the slot 146 at station T, the point 479 of the upper body 151 is carried to a position upon the center line between the shafts 140 and 142 so that the arcuate section 477 of the upper body is against a section 145 of the cam 144 to prevent further turning of the cam.

It is in this manner that an intermittent counterclockwise movement is imparted to the sleeve 143 and the turret 472. Each time that the turret is given a movement by the cams 149 and 144 it is moved through ninety degrees. Therefore, the fruit cups 460 which are arranged quadrantly about the turret will be at one of four stations designated by letters W, X, Y, and Z each time they are stopped in their movement (see Figure 5).

Attention will now be directed particularly to the construction of the fruit cups which are disposed upon the fruit turret. The fruit cup illustrated in Figure 24 will be noted to have a stationary wall section 481a with a stem 482. In the lower part of the stem 482 there is formed a notch 483 and a slot 484 communicating to the bottom of the stem. Anchored within the stem 482 to project beyond either side thereof is a short shaft 485 to which the stem 486 of a movable cup wall 487 is pivoted by means of a bearing 488. Below the bearing 488 in the movable cup member 489 is an arm 490 having at its lower end a roller bearing 491 rotatively held thereto by a bolt 492.

Figure 24 shows a cup 460 with the cup walls in the opposite position. Figure 25 shows the walls 481a and 487 in the closed position. It will be noted that the cup wall sections do not form a truly arcuate configuration when they are closed, but that they do when opened.

Figures 26 and 27 show the inner surface of the cup walls as comprising ribs 494 and grooves 495, the ribs and grooves running transversely of the main axis of the cup.

When the fruit cups 460 are attached to the fruit turret 472 the notches 483 are seated upon the lugs 476 and bolts 496 co-transgress the apertures within the lugs 476 and the slots 484 within the cup stems 482 to hold the cups in place. Projecting from the movable cup element 489 are arms 497 having threaded apertures 498 for the accommodation of bolts 499. Beneath the heads of the bolts 499 and in suitably apertured bosses 500 in the turret 472 are adjustment screws 501 having lock nuts 502 thereon. It is the purpose of the arms 497 and the adjustment screws 501 to provide for adjustment of the size of the fruit cups 460. When the lock nut 502 is loosened and the screw 501 advanced upwardly, the fruit cups will be partially closed.

An explanation of the operation of the fruit cups will be reserved until later when it will be given in combination with an explanation of the operation of the peeling mechanism which will now be described.

Peeling mechanism

To the outer sides of the two upright members 50 and 51 which are disposed in a common vertical plane are bolted angle pieces 510, a fragment of one of such pieces being shown in Figure 28. Attached to the flanges 511 of the angle pieces 510 and which project outwardly from the side of the machine are flat side strips 512 to be held in place by bolt 513. Countersunk sections 514 within the flanges 511 provide a space for the heads of bolts 514a which hold the angle pieces 510 in assembly with the upright pieces 50 and 51. A track is formed on the two upright members 50 and 51 by the angle pieces 510 and the guide strips or plates 512. Within such track there is disposed a yoke 515 for vertical reciprocation.

Depending from a cross member 516 at the bottom of the yoke 515 is a bracket 517 integral therewith and presenting opposed apertured lugs 518 and a slot 519. Intermediate the two lugs 518 there projects the arm 520 of the cam follower plate 325 (Figures 23 and 17).

A bolt 520a within the slot 519 holds the arm 520 in assembly with the bracket 517. Adjustment of the height of the yoke 515 relative to the arm 520 may be accomplished by manipulating the set screws 521.

Within the cam follower 325 is a vertically arranged slot 522 for the reception of the main cam shaft 113 and to provide for a vertical movement of the cam follower. The roller bearing 324 coacts with the cam slot 323 for raising and lowering the cam follower 325 and hence the yoke 515.

Projecting to the left from the cross bar 523 at the top of the yoke 515 are two arms 524 and 525 (see Figures 28 and 29). To the ends of said arms is attached a frame 526 for holding the peeling mechanism. Ears 527 of the peeling mechanism are attached to the arms 524 and 525 by means of bolts 528. Between the left ends of two parallel bars 529 which form a part of the frame 526 is a bearing block 530 which serves as a journal for one end of the shaft 531. The right end of the shaft 531 is journaled within a bearing block 532 at the right end of the frame. Bolts 533 provide an anchorage for the bearing blocks 530 and 532 to the frame member.

Extending downwardly from the left end of the frame 526 are legs 534 to which are attached by means of bolts 535 apertured arms 536. The arms 536 if desired may be integral with the legs 534 instead of being fabricated thereto. Journaled within bearings 537 and 538 within the legs 534 and arms 536 respectively are short spindles 539 to which ends of a peeling blade 540 are indirectly attached through the agency of heads 541. Pinions 539a are feathered to the shaft 539. A segmental gear 542 is fastened to the left end of the shaft 531 by means of a set screw 543 to rotate therewith and to commonly mesh with the two pinions 539a. Depending from the right side of the frame 562 are legs 544 having upturned sections 545, there being bearings 546 and 547 in the depending parts for the journaling of spindles 548. Between the upturned sections 545 and the legs 544 the spindles 548 carry pinions 549, while the leftmost end of the spindles 548 carries heads 550 to which the opposite ends of the blades 540 may be attached in any standard manner.

Figure 30 shows the contour taken by the blade 540 and the exact manner in which it is attached to the heads 541 and 550. In the present instance the contour of the blade is similar to a longitudinal surface element of a pear. In Figure 28 it will be noted that the leading and sharpened edge 551 of the blade 540 is formed about the common axis of the two spindles 539 and 548 as a line of generation for each section thereof.

Just to the left of the legs 547 upon each of the spindles 548 there will be noted a cam 552 (Figures 24 and 31). Each cam 552 embodies a sharp shoulder 553, an arcuate section 554 followed by an inclination 555 and a long arcuate section 556. The cams 552 are placed fixedly upon the spindles 548 in a selected angular relation relative to the peeling blades 540.

Upon the right end of the shaft 531 is fastened a segmental gear 557 by means of a set screw 558. The gear 557 engages both of the pinions 549. An arm 559 integral of the gear 557 extends upwardly to where it pivotally engages a clevis member 560 by means of a bolt 561. To the shorter end of the lever 312 is pivotally fastened a second clevis member 562, there being connected between the two clevises 562 and 560 an adjustable link 563. In this manner the segmental gear 557 is in operative connection with the lever 312 and the vertical operating shaft 315.

Attached to each of the legs 544 at the bottom thereof by means of bolts 564 is a bearing block 565 in which there is journaled a stem 566. Near the left end of each stem 566 is a sleeve 566a rotatively placed thereon and having three fingers designated by the numbers 567, 568, and 569, projecting therefrom (see Figure 31). Upon the fingers 567 are carried roller bearings 570 for coacting with the cam 552 adjacent thereto. The sleeves 566a are constantly urged to rotate in a counter-clockwise direction with reference from the right side of the machine due to the urge of contact springs 570a which have ends anchored at 571 in the yoke 515 and the opposite ends connected to the fingers 568. In this manner the roller bearings 570 are urged against their respective cams 552. Attached to the fingers 569 are leaf springs 572 which are curved at their lower extremities to facilitate guidance into proper contact with the roller bearings 491 on the fruit cups therebeneath during certain stages of operation. Several notches 573 are formed within the lower edges of the fingers 568 to which the springs 570 may be attached.

To the top of each of the frame members 529 is secured a Z bracket 574 which is held in place by means of bolts 575. In the top of each of the brackets 574 is a threaded aperture 576 for the reception of a thumb-screw 577 having upon its lower end a flanged boss 578 and a lock nut 579.

Associated with each of the Z brackets 574 and its respective side frame member 529 is a peeling pad mechanism. Since each of these mechanisms is alike the description will be directed particularly to the one shown in Figure 28.

Centrally located in the frame members 529 is a vertical bearing 580 which is lined with a bushing 581. Reciprocally held within the bushing 581 is a sleeve 582 having a channel 583 extending upwardly from the bottom thereof to continue into a bearing 584, the channel and bearing adjoining at a shoulder 585. At the bottom of the sleeve 582 is a head 586 containing an inverted channel 587. Pivotally held within the channel 587 by means of a pin 588 is the head 589 of a peeling pad 590. On the top of the head 589 are two angular faces 591 and 592 to form a dihedral, the two faces being adapted to abut against the ceiling of the groove 587 to limit the pivotal movement of the peeling pad. Cotransgressing the peeling pad head 589 and the peeling pad 590 is an aperture 593 which is in alinement with the channel 583 in the sleeve 582. The lower end of the aperture 593 is countersunk at 594 in the face of the peeling pad.

Extending through the openings 583 and 593 to be reciprocally contained within the bearing 584 is a stem 595 having on the lower end thereof a knockout pad 596 which is of a thickness and diameter to set within the countersunk section 594. At the upper end of the stem 595 are placed collars 597 and 598 to limit the downward movement of the stem as it is urged by a compression spring 599, the latter pressing against the shoulder 585 and a block 600 which is secured to the stem by means of a pin 601.

About the sleeve 582 at its top is a collar 602 having a flat side 603 for sliding against the side of the bracket 574 (see Figure 34). A thumb screw 604 is provided for holding the collar 602 to the sleeve 582. Between the collar 602 and the flanged lug 578 is a compression spring 605 which constantly urges the sleeve 582 downwardly to the limit provided by the collar 602 abutting against the top of the bearing 580. The knockout pad 596 is always urged from the seat 594 in the manner shown in Figure 26. The spring 599 is much weaker than the spring 605 so that the knockout pad 596 may be forced upwardly into the seat 594 without first moving the peeling pad 590 upwardly by compressing the spring 605. Turning of the sleeve 582 in the bearing 580 is prevented by the flat face 603 of the collar 602 against the Z bracket 574.

After the fruit has been deposited within the fruit cups 460 at station W by the leaf-like members 432 associated with the splitting knife, the turret is given a turn in a counter-clockwise direction to deliver that pair of cups to station X (Figure 5). It is at station X that the peeling operation is enacted upon the fruit. At the time the fruit cups arrive at station X the segmental gear 557 will be in the position shown in Figure 2 while the cam plate 120 and the cam followers 121 and 122 will be in the position shown in Figure 17. It will be recalled that the face cam plate 120 is to be rotated in a clockwise direction (Figure 17).

While the cam plate 120 is rotating to carry the section of the groove 322 which lies between the points 605 and 606 past the roller 320 there will be no movement of the cam follower 122 for the groove between those points is of constant radius from the shaft 113. When the point 606 arrives opposite to the roller 320, the cam follower 121 will be to the backmost of its reciprocal limits, the segmental gear 557 will be rotated to the most counter-clockwise of its oscillative limits, and the peeling blades 540 will be rotated to the position shown in Figure 32. When in this position, the blades 540 are ready to make a cut into the fruit for severing the peeling therefrom.

Concurrently with the movement of the cam 120 to place the point 606 opposite to the roller 320, the roller 324 is allowed to fall along the section of the groove 323 between the points 607 and 608. In this manner, the cam follower 325 is lowered to lower the yoke 515 and the peeling mechanism whereby the peeling pads 590 are lowered against the faces of the fruit which are in the fruit cups at the peeling station. While the fruit is thus held firmly within the cups by the peeling pads and the cam 120 continues to rotate, the roller 320 is displaced forwardly as the radial position 609 is carried oppositely thereto. Movement of the roller 320 and the cam follower 121 forwardly causes a counter-clockwise rotation of the shaft 315 whereby the segmental gear 557 is given a clockwise movement, with reference from the right side of the machine, to rotate the pinions 549 and the peeling blades 540 in a counter-clockwise direction to pass the blades along the walls of their respective fruit cups just beneath the surface of the skin of the fruit held by such cups. During the cutting movement of the blades 540 caused by the forward displacement of the roller 320, the roller 324 is maintained at a constant elevation while the section of the groove 323 between the radial points 608 and 605 is passed therebeneath. Consequently, the yoke 515 and the peeling mechanism are maintained downwardly in contact with the fruit being peeled.

During the turning of the cam 120 through an additional forty-five degrees to remove the point 605 thereunder, the peeling mechanism is maintained at the lower elevation on account of the equal radii of the groove 323 between those points. The roller 320 during the last named movement of the cam 120 moves to a point forty-five degrees beyond the point 609. Continued movement of the cam 120 in a clockwise direction brings the point 609 opposite to the roller 324 whereby that roller is displaced upwardly to lift the peeling mechanism from the fruit which has been peeled. At the same time the roller 320 traverses an additional forty-five degrees of the remaining distance between the points 609 and 607 to maintain the cam follower 121 in its most forward position and consequently to maintain the peeling blades 540 in a counter-clockwise position slightly above the horizontal.

After the roller 324 and the parts supported thereby have been elevated by the displacement of the roller opposite to the radial position 609, the peeling blades 540 will be clear of the fruit and may be rotated in the opposite direction to that which they were rotated when making the cut through the fruit and to replace them to a position in readiness to make a succeeding cut. Hence, after the cam 120 turns through an additional ninety degrees, the point 607 will be opposite to the roller 320 and during the next forty-five degree movement of the cam 120, the roller 320 is traversed by the camming surface of the groove 322 between the radial positions 607 and 608 whereby the camming follower 121 is withdrawn rearwardly to cause a clockwise movement of the blades 540, with reference from the right side of the machine. While the roller 320 is being carried rearwardly by its respective groove section between the radial positions 607 and 608, the roller 324 is maintained at its higher elevation.

During the next forty-five degree movement of the cam 120, the cam follower 121 is maintained at its backwardly position while the roller 320 is traversed by the groove section between the points 608 and 606; the roller 324 is maintained in its upper position as it is rolled along the groove 323 to the position 607. At this time the machine will again be arranged as shown in Figures 2 and 17.

After the peeling blades 540 have passed through the fruit to sever the skin therefrom and the peeling mechanism has been elevated from the fruit, the fruit turret is given a counter-clockwise movement to remove the pared fruit from the peeling station to a coring station, which will be described later. Simultaneously with the removal of the pared fruit from the peeling station to the coring station, different fruit is placed at the peeling station. It follows that when the cam 120 has completed a revolution to again place the roller 324 in coincidence with the radial position 607 and the roller 320 in coincidence with the position 605 in readiness to enact another peeling operation there is a fruit in position to be acted upon.

The cooperation of the fruit cups 460 with the peeling mechanism will now be described.

When the yoke 515 in support of the peeling mechanism is lowered to place the peeling pads 590 against the fruit, the springs 572 are lowered against the rollers 691 depending from the movable elements of the fruit cups. As the springs 572 are lowered along the sides of the rollers 591, the cup elements 489 are rotated in a counter-clockwise direction to close the cup walls tightly about the fruit. The walls of the fruit cup are not positively compressed against the sides of the fruit on account of the fact that the compression of the walls is caused by the springs 510a.

In Figure 24a, the position of a peeling blade 540 and of a cam 552 at the time the peeling pads 590 are carried against the fruit is illustrated. It will be noted in Figure 24 that the camming surface 554 of the cam 552 is against the roller 570 and that the full effect of the contraction spring 510a is available. Figure 25 illustrates the position of a fruit cup when the peeling mechanism has been entirely lowered and when the roller bearing 591 has been displaced by the spring 572 for the closing of the cup. In this manner the fruit is held tightly by the walls of the cup when the peeling blade 540 first makes its entrance thereinto to sever the peeling from the fruit. Since the stationary cup element has walls, the interior of which are generated about an origin coinciding with the axis of the peeling blades, the blades will swing at a uniform selected distance from the walls of the fixed elements. The cup walls of the movable elements when the cups are closed do not coincide with an arc generated about the rotating axis of the peeling blades and therefore must be removed from the path to be taken by the blades before the blades start to traverse the movable cup walls (see Figure 25).

In Figure 29 a fruit cup is illustrated after the peeling blade 540 has made entrance to the fruit and has approached very nearly the end of the stationary cup wall. The cam 552 which rotates with the peeling blade 540 is arranged radially with the blade so that the inclined camming surface 555 will traverse the roller 570 to rotate the collar 566a whereby the leaf spring 572 is removed from the roller 591 before the blade 540 reaches the movable cup element. In this manner, the pressure is relieved from the arm 490 of the movable cup element, the pressure having been exerted by spring 570a, to permit the movable cup element to pivot about the shaft 485 to allow the cup walls to spread apart. Continued movement of the blade 540 tends to press the fruit which is being peeled against the movable cup walls to assist in the displacement of the movable cup wall so that its inner surface will be arranged in parallelism with the path taken by the blade as it is traversed thereby. That is, the movable cup walls are constructed about origins which coincide with the rotating axes of the blades 540 when the cups are in the open position. During the time that the blade 540 is passing along the cup wall 487 the effect of the spring 510a is overcome by the roller 570 which is being displaced against the urge of the said spring by the passing of the camming surface 556 along the roller.

In Figure 30 the position of a peeling cup and the peeling blade therefor is illustrated after the blade has completely traversed the cup walls to have peeled a fruit. After the peeling blade has been rotated to the position shown in Figure 30, the roller bearing 324 in support of the peeling mechanism will be in registry with the radial position 606 in the cam 120 in readiness to elevate the peeling mechanism pursuant to further rotation of the cam.

It is the purpose of the knockout pads 596 to prevent the peeling pads 590 from adhering to the fruit and thus lifting it from the fruit cups when the peeling mechanism is elevated. The springs 599 are of sufficient strength to break the vacuum between the flat face of the fruit and the peeling pads by urging the knockout pads thereagainst, and the area of the knockout pads is too small for the creation of a vacuum therebetween and the fruit to suspend the fruit. The fruit is then released from the peeling pads by the knockout pads and allowed to remain as prearranged in the fruit cups. When the fruit is pressed from the peeling pad by a knockout pad, the peeling pad is pivoted clockwise (Figure 28) until the face 592 contacts the ceiling of the groove 587. Since the component of force exerted by the knockout pad is vertical, the end of the fruit at the upper portion of the tilted peeling pad will be first released, thus making it easier to destroy the vacuum between the fruit and pad.

A more effective peeling of the fruit is made possible because of the ribbed effect of the cup walls. The pressure of the walls upon the fruit being peeled is concentrated at the points where the ribs 494 are in contact with the peel so that the friction between the fruit peel and the cup walls will be increased at those sections. This condition eliminates the tendency of the peeling to slide along the cup walls with the blade in its movement. It has been found that when the walls of a fruit cup are made smooth that there is a tendency for the peeling to creep along with the blade to clog the blade and to thus impair the peeling operation. So far as maintaining the peeling of the fruit in a fixed relation to a cup wall is concerned, many designs or scorings of the cup wall will be as effective as the design illustrated. However, the present design has the special advantage of adapting the cup walls to have the peeling removed therefrom by a cup cleaning mechanism later to be described.

*The coring mechanism*

Extending between the two upright frame members 51 and 52 at the back of the machine is a bar 610 which serves as a support for the coring device (see Figure 3). In either end of the bar 610 is a bearing 611 covered by a pillow block 612. Bolts 613 hold the pillow block in place to the bearings 611. Commonly held at opposite ends within the bearings 611 is a shaft 614. At the center of the shaft 614 is attached a sleeve 615 and by means of a set screw 616 to rotate with the shaft. Integral with the sleeve 615 at either end thereof are split collars 617 having apertured ears 618 for the reception of bolts 619. Beneath the heads of the bolts 619 are springs 620 for cushioning the compression effect of the bolts (Figure 33). In said figure it will be noted that the collars 617 have a greater internal diameter than that of the shaft 614 so that there is a space between the collars and the shaft. Projecting from the sleeve 615 is a lug 621 upon which there is a strip 622 having a downwardly turned end 623.

Adjacent to the outer end of each of the collars 617 and upon the shaft 614 is mounted a compound bearing block 624, one of said blocks being shown in detail in Figure 36. Traversing each bearing block 624, laterally, is a bearing 625 for receiving the shaft 614. The bearing block 624 shown in Figure 36 is the one at the right of the sleeve 615 with reference from the front of the machine and since the bearing block to the left of the sleeve is identical thereto, as are the appendages therefrom, the description will be confined particularly to the bearing block shown in Figure 36 and the parts associated therewith.

Extending from the body of the bearing block 624 is a collar 626 (Figures 3, 35 and 37) which projects beneath the split collar 617 adjacent thereto. A bronze bushing 627 is attached to the shaft 614 beneath the collar 626. By tightening the adjustment screw 619 the spring 620 is further compressed to draw the split collar 617 more tightly about the collar 626 and to thereby increase the frictional engagement between the collar 626 and the split collar 617. The bearing block 624 is free to rotate about the bushing 627 and hence the shaft 614 excepting for the frictional engagement between the collar 626 and the split collar 617, the latter being immovable relative to the shaft 614 since it is a part of the sleeve 615 which is secured to the shaft by the set screw 616.

Lubrication of the bearing 625 which traverses the collar 626 is provided by a cap 628 which is screwed into a threaded aperture 629 leading to the bearing.

In the block 624 is a bearing 630 extending normally to the bearing 625. Within the bearing 630 there is journaled a sleeve 631 having a flange 632. A notch 633 is cut within the face of the flange 632 in the manner shown in Figure 38. The base 634 of a coring paddle 635 engages the flanged end of the sleeve 631 by projecting a lug 636 into the notch 633. A flanged running nut 637 coengages the flange 632 and threads 638 upon the coring paddle base to assist the lugs 636 to hold the coring paddle and the sleeve 631 in assembly.

A plan view of the coring paddles 635 is shown in Figure 3. Extending from the base 634 are two symmetrically shaped bar members 639 which are adjoined at their extended ends in a head 640. The central portions of the bars 639 swerve outwardly in opposed relationship to provide an enlarged space 641 therebetween to accommodate an enlarged section of a coring spoon 642. Within the flat front faces of the coring paddles 635, exposed in Figure 3, are countersunk sections in which the fingers 634 of U-shaped flipper members 644 are adapted to be seated to be made flush with said faces.

In Figure 39 are shown pins 645 anchored in opposite sides of a peeling paddle head 640 to serve as journals for the flipper member 644. Held to the pins 645 by keys 646 are torsional springs 647 which engage the flipper member 644 to constantly urge it to rotate about the pins 645 in a direction to keep the fingers 643 seated within the cut-away sections provided therefor in the front faces of the coring paddles.

Reference to Figure 36 will now be had where there is shown a spindle 648 which is rotatively stationed within the sleeve 631. At the right end of the spindle 648 (Figure 36) is a lug 649 to which an end of a coring spoon 642 is attached by means of a set screw 651. Said coring spoon is a cucullated member having either longitudinal edge sharpened. In the center of the coring spoon is an enlarged section 652 having sections 653 and 654 at either side. It is the purpose of the enlarged spoon section 652 to remove the core proper from a fruit, while the sections 653 and 654 sever the threads which extend between the core and the blossom end of the fruit and between the core and the stem bearing end of the fruit respectively.

Set within the extended end of the coring spoon is a spindle 655 which is journalled in a bearing 656 provided within the head 640 of the coring paddle.

Circumscribing the sleeve 631 at a section disposed within the bearing 630 is a shallow channel 657 having an aperture 658 communicating to the interior of the sleeve. Registering within the aperture 658 is the end of a channel 659 which communicates to the left end of the spindle 648. A grease plug 660 is threaded into the channel 659 at the end of the stem 648. About the spindle 648 at the section where the inner end of the channel 659 terminates is a groove 661.

Held to the bearing block 624 by means of bolts or screws 662 is an arm 663 having in its extended end a bearing 664 in alinement with the bearing provided within the sleeve 631 and for receiving an end of the spindle 648. Beyond the bearing 664 and about the spindle 648 is a collar 665 which is held to the spindle by means of a set screw 666. It is the purpose of the collar 665 to prevent longitudinal movement of the spindle 648.

Intermediate the bearing 664 and the sleeve 631 there is secured to the spindle 648 a pinion 668 by means of a key 667. At the end of the key 667 is a lug 669. The lug 669 projects from the face of the pinion 668 into the path of lugs 670 and 671 which project respectively from a collar 672 and from an end of the sleeve 631. The collar 672 is fixedly attached to the sleeve 831 by means of a set screw 673. In Figure 40 it will be noted that the lugs 670 and 671 subtend angles with reference from the axis of the spindle 648.

Within an aperture 674 in the bearing block 624 is threaded a sleeve 675 which extends very closely to the periphery of the collar 672. Placed within the sleeve 675 is a ball bearing 676 to be held impingingly against the collar 672 by means of a spring 677, the latter being pressed downwardly into the sleeve by a set screw 678. Adjacent to the aperture 674 is a threaded aperture 679 into which there is threaded an adjustment nut 680 whose utility will be explained later in the description. Set within the opposite end of the bearing block 624 from the bolt 680 is a pin 681 to serve as a journal for a roller 682 shown in Figures 35 and 37.

In Figure 37 there will be noted a bracket 683 attached to the cross bar 610 by means of bolts 684. An enlarged view of the bracket 683 and the parts assembled therewith is shown in Figure 41. Formed in the upper body of the bracket 683 are bearings 685 in which there is journaled a shaft 686. Upon the ends of the shaft 686 are cams 687 which are attached to the shaft 686 by means of set screws 688. Intermediate the bearings 685 there is keyed to the shaft 686 an arm 687a upon which there is journaled by means of a bolt 688 a roller bearing 689 and into which there is anchored a pin 690 for abutting against a pin 691 during certain stages of operation of the device. The pin 691 is anchored in the side wall of the bearing 685 to the left (Figure 41).

Wrapped about the shaft 686 is a torsional spring 692 having one end attached to the arm 687a by means of a screw 693, the opposite end being attached to a bearing block 685 by means of a screw 694. The urge exerted by the spring 692 is such as to rotate the shaft 686 in a direction to hold the pin 690 against the pin 691. In Figures 35 and 37 is shown a side elevation of one of the cams 687. Here it will be noted that the cams have a fall 695, a rise 696, a camming surface 697, and a camming surface 698. Depending from the frame member 54 at the top of the machine are bars 699 having grooves 700 in their lower ends. Sprags 701 are pintled in the grooves 700 by means of pins 702. In Figure 37 it will be noted that points 703 of the sprags strike against the ceiling of the grooves 700 to prevent turning of the sprags outwardly of the machine frame. An arcuate section 704 permits the sprags to be pivoted inwardly of the machine frame.

To the left side of the machine frame displayed in Figure 4 is attached a bar 705 having bearings 706 in either end for the journaling of a shaft 707. Pillow blocks 708 are held in position to the bearings 706 by means of bolts 709. Upon the back end of the shaft 707 is a pinion 710 which meshes with a pinion 711 upon the left end of the shaft 614 and for driving the latter named shaft. Forwardly of the bearing 706 at the back side of the machine there is keyed a pinion 712 to the shaft 707, there being a rack 713 for commonly engaging the pinion 712 and the cam follower plate 126. For guiding the rack 713 there is a grooved member 714 held to the bar 705 by means of bolts 715.

By reference to Figure 9 it will be seen how the cam follower 126 is raised and lowered by the face cam 125 and by means of the groove 130 which is eccentric of the rotating axis of the face cam 125. The roller bearing 131 which is attached to the cam follower 126 in a manner to project into the groove 130 moves the cam follower 126 upwardly and downwardly as is permitted by the oblong slot 133 within the body of said follower.

When the cam follower 126 and the rack 713 are reciprocated upwardly and downwardly the shaft 707 which is operatively connected to the rack 713 by the pinion 712 is caused to oscillate. Similarly the shaft 614 which is connected to the shaft 707 by the pinions 711 and 710 is caused to oscillate. On the outer side of the bearing blocks 624 there are secured to the shaft 614 beveled gears 716 by means of set screws 717. The beveled gears 716 mesh with the pinions 668 so that when the bearing blocks 624 are held against rotating with the shaft 614 the pinions 668 will be caused to rotate.

The description of operation of the coring device will be confined strictly to the coring instrumentality furtherest to the right upon the shaft 614 since the other instrumentality operates in a similar fashion except that the direction of movement of its parts is reversed because of the fact that the beveled gear 716 for the driving thereof is on the opposite side. Attention will now be directed to Figures 37 and 42, where the coring paddle 63E and the coring spoon 653 are shown in the vertical position with the spoon presenting its two opposite edges to the front face of the coring paddle. At this time the rack 713 is commencing a downward movement. Movement of the rack downwardly causes a rotation of the shaft 614 in a clockwise direction with reference from the left side of the machine. Hereafter in the description of this part of the device the direction of rotation will be taken with reference from the left side of the machine. Unless otherwise noted rotation of the spindle 648, the sleeve 631 and the parts attached thereto will be taken with reference from the extended end of the paddle and coring spoon. As the shaft 614 is rotated in a clockwise direction the frictional engagement between the split collar 617 and the collar 626 causes the bearing block 624 to rotate with the shaft. The coring paddle continues to rotate with the shaft 614 until the forward face thereof comes in contact with the fruit 238 within the fruit cup 460 thereunder in the manner shown in Figure 43. While the coring paddle is being carried into such position with the fruit, the shaft 686 remains in such a position that the camming surface 697 will be presented to the roller bearing 682 upon the bearing block 624 and so that the coring paddle will not be obstructed in its movement to engage the fruit.

After the engagement of the fruit 238 by the coring paddle further turning of the coring instrumentality with the shaft 614 is prevented. It follows that when there is a further clockwise turning of the shaft 614 the beveled gear 716 causes a turning of the pinion 668 and the spindle 648 in a counter-clockwise direction. Thus the coring spoon 653 is caused to rotate in the manner indicated by the arrow in Figure 43. When the coring spoon and coring paddle are in the position shown in Figure 42 or 43 and the coring paddle is against the fruit 238, the lugs 670, 671 and 669 are in the position shown in Figure 44. Rotation of the pinion 668 after the peeling paddle is in contact with the fruit 238 cannot rotate the paddle 635 because of the engagement of the paddle with the fruit. Therefore, the spindle 648 and the coring spoon 642 rotate together through an angle of 203 degrees to place the coring spoon and the coring paddle in the relative position shown in Figure 45. While the coring spoon 642 is rotated through the 203 degree angle to sever the core from the fruit, the coring paddle 635 is being held tightly against the severed face of the fruit by the frictional engagement of the split collar 617 with the collar 626 which tends to rotate the bearing block 624 and the coring paddle therewith.

When the coring paddle 635 first comes in contact with the severed face of the fruit 238 the downturned end 623 of the strap 622 upon the lug 621 makes contact with the roller bearing 689 to rotate the arm 687a, the shaft 686 and the cams 687 incident to a further turning of the shaft 614. While the coring spoon 642 is being rotated through the 203 degrees to sever the core from the fruit, the cam 687 is passing the camming surface 697 beneath the roller 682. Concurrently with the finishing of the core severing stroke the cam 687a is rotated to a position to bring the inclined camming surface 696 beneath the roller bearing 682 to impart a slightly counter-clockwise movement to the bearing block 624 and to thereby lift the coring paddle 635 slightly from the fruit cup. When the coring spoon 642 has finished its cutting stroke and is in the position shown in Figure 45 the lug 669 has been moved from the position shown in Figure 44 to a position in contact with the opposite edges of the lugs 670 and 671. Further turning of the shaft 614 will then cause the lug 669 to turn the lugs 670 and 671 therewith and to cause a turning of the sleeve 631 with the spindle 648. The spindle 648 and the sleeve 631 are then rotated together through an angle of one hundred eighty degrees. The position assumed by the parts under discussion at the finish of the one hundred eighty degree movement is illustrated in Figures 46 and 46a. By inverting the coring paddle and the coring spoon from the position shown in Figure 45 the fruit 238 is rotated from the fruit cup 460 to lie upon the coring paddle while the core 900 drops through the space between the two members of the coring paddle to fall within the fruit cup with the fruit peel in the manner illustrated in Figure 35.

While the coring paddle 635 is being rotated to root the fruit from the fruit cup the main body of the strip 622 upon the lug 621 is being passed along the roller 689 to hold the arm 687a rotated in the position shown in Figure 35 so that the camming surface 698 of the cam 687 will be presented to the roller bearing 682 to maintain the bearing block 624 in the previously rotated counter-clockwise position whereby the coring paddle is maintained slightly elevated from the fruit cup. It is desirable to elevate the coring paddle a slight distance from the fruit cup while the fruit is being rotated therefrom so that the coring paddle will not injure the fruit by pressing it too tightly against the cup walls. Injury to the fruit might occur if the fruit was of a slightly larger size than for which the machine had been set. Because of the flat faces of the coring paddle and the fruit and the viscosity of the fruit juice a vacuum is formed between those faces so that the fruit is lifted from the cup along with the coring paddle.

As soon as the core 900 has been severed from the fruit, and the fruit is lifted from the fruit cup 460 in the manner shown in Figure 46, the downward movement of the rack 713 is stopped and an upward movement thereof is immediately started. Movement of the rack 713 upwardly causes a counter-clockwise movement of the shaft 614 and a turning of the bearing block 624 therewith because of the frictional engagement of the split collar 617 with the collar 626 which projects from the bearing block. So long as the bearing block 624 rotates with the shaft 614 as does the beveled gear 716 there will be no movement of the beveled gear relative to the pinion 668 and hence no turning of the coring paddle or coring blade. The fruit which lies upon the coring paddle will be lifted upwardly until the flipper member 644 strikes the sprag 701 in the manner shown in dotted outline in Figure 37. After the flipper member 644 strikes the sprag 701 the coring paddle continues in its counter-clockwise movement causing a pivotal movement of the flipper member to lift the fingers 643 from their set within the face of the coring paddle to flip the fruit from the paddle in the manner shown. The fruit so unseated from its position upon the coring paddle may fall into a receptacle or other means for catching the fruit such as a moving belt or stream of water.

After the fruit 238 has been removed from the upwardly moving coring paddle the shaft 614 and the coring paddle continue the counter-clockwise movement together until a substantially upright position of the coring paddle is reached. The upright position is determined by the striking of the heads of bolts 680 and 680a (see Figure 37). Further movement of the bearing block 624 along with the shaft 614 is precluded when the adjustment bolts 680 and 680a come together. However, the shaft 614 and the beveled gear 716 continue to rotate in a counter-clockwise direction. A counter-clockwise movement of the beveled gear 716 while the bearing block 624 is held stationary causes a clockwise movement of the pinion 648. It is at this time that the roller bearing 676 comes into play. It is the purpose of the roller bearing 676 to engage the collar 672 to prevent movement of the sleeve 631 along with the spindle 648 while the latter named member and the coring spoon attached thereto are being rotated in the clockwise direction. Thus the coring paddle is held stationary while the pinion and the lug 669 are being rotated 203 degrees clockwise from the position shown in dotted outline in Figure 44. This 203 degree clockwise movement of the pinion and coring spoon carries the coring spoon into the position relative to the coring paddle illustrated in Figure 42. Continued turning of the shaft 614 in the counter-clockwise direction then causes the lugs 671 and 670, which are then engaged at their opposite sides by the lug 669, to rotate with the pinion 668 through one hundred eighty degrees at which time the rack 713 has reached the upper of its reciprocal limits. During the last 180 degree movement of the pinion 668 the coring spoon and coring paddle are rotated together to be positioned as illustrated in Figure 37 for the succeeding downward movement to engage a different fruit when the downward movement of the rack 713 is commenced.

While the bearing block 624 is being rotated in a counter-clockwise direction the lug 621 is being removed from the roller bearing 689 to permit the rotation of the arm 687a, the shaft 686, and the cam 687 in a clockwise direction by the spring 692 to replace them in some such position as shown in Figure 37. It is in this manner that the camming surface 697 is replaced in readiness to again be contacted by the roller bearing 682 when the coring paddle is brought into engagement with a fruit and while the coring spoon is being drawn through the fruit for removing the core.

Pursuant to the clockwise movement of the shaft 614 to carry the coring spoon and coring paddle into operative positions with a fruit the end of the flipping member knocks the sprag 701 from its path in the manner illustrated in Figure 35.

The cup cleaning mechanism

After the fruit has been cored at station Y and the fruit removed therefrom to leave the core and peeling within the cups, the fruit turret is given a movement to advance those cups to station Z. It is at this station that the peeling and cores are removed from the cups.

Figures 47, 48:
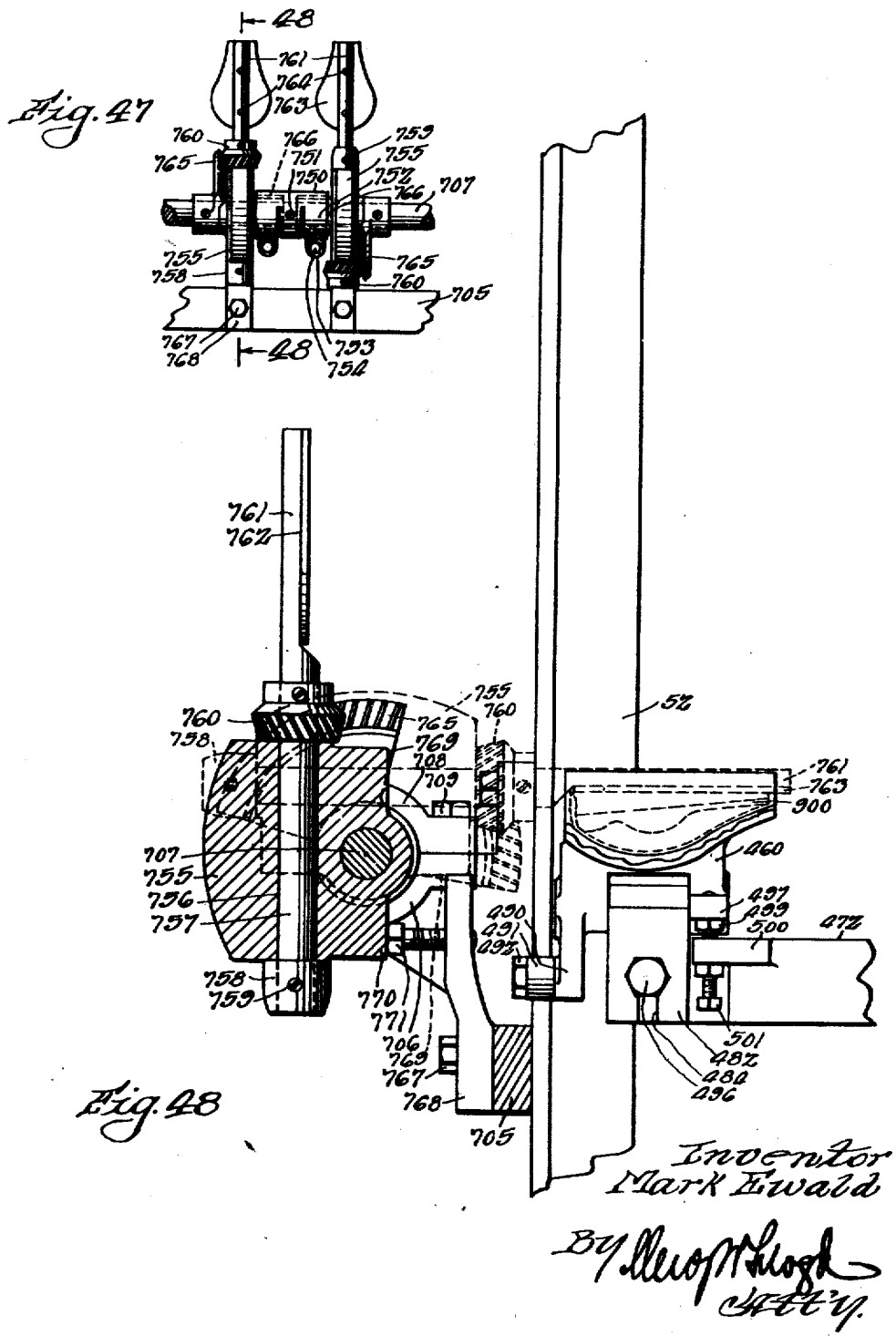
Figure 47 is a perspective view of a mechanism for cleaning the fruit cups.
Figure 48 is a sectional view of the mechanism illustrated in Figure 47 taken along the line 48—48 of that figure.

A set screw 751 may be used to secure a sleeve 750 to the shaft 707 substantially midway its two ends. At either end of the sleeve 750 and integral thereto are split collars 752 having apertured ears 753, the apertures being suitably threaded for coacting with the threads upon bolts 754 for drawing the pairs of ears together. Upon either side of the sleeve 750 beyond the split collars 752 are identical bearing blocks 755 which are shown in Figures 4, 47 and 48. The bearing block shown in Figure 48 has therein a bearing 756 for a spindle 757. At the outer end of the spindle 757 is a collar 758 held thereto by a set screw 759. Upon the spindle 757 at the opposite end adjacently to the bearing block is a pinion 760. The pinion 760 and the collar 758 hold the spindle 757 against longitudinal displacement. The extended end 761 of the spindle 757 has a flat face 762 to which a flat leaf-like cleaner plate 763 is secured by rivets or screws 764. The contour taken by the edge of the cleaner plates 763 (Figure 47) is the same as a longitudinal wall element of the fruit cups.

The manner in which the spindle 757 is secured in the bearing block 755 at the right of the sleeve 750 (Figure 47) differs from the assembly just described in that the position of the collar 758 and the pinion 760 upon the spindle 757 is reversed. At the sides of the bearing blocks 755 are segmental beveled gears 765 fixedly secured to the shaft 707. The gears 765 mesh with the pinions 760. Projecting from the face of the bearing blocks 755 opposite to the side at which the beveled gears 765 are disposed are collars 766 which project into the split collars 752. There is a frictional engagement between the split collars 752 and the collars 766, the amount of friction being adjustable by turning of the bolts 754 to change the diameter of the split collars. Attached to the cross bar 705 by means of bolts 767 are stop pieces 768 projecting upwardly to engage an end of the bearing block 755 during certain stages of the operation of the device, in the manner illustrated in dotted outline in Figure 48.

The fruit cups laden with the peeling and severed cores are delivered to station Z simultaneously with the delivery of fruit to be cored at station Y. Subsequent to the arrival of the fruit to be cored and the fruit cups to be scavenged at their respective stations, the rack 713 is given a downward movement to rotate the shaft 707 and the shaft 614 in a direction to bring the coring paddles and the cleaning plates 763 toward their respective cups. When the shaft 707 is rotated in a clockwise direction, Figure 48, the spindles 757 are moved with the bearing blocks 755 with the cleaning plates 763 in the position shown in said figure. The friction between the split collars 752 and the collars 766 causes the bearing blocks to rotate with the shaft 707. Concurrently with the arrival of the spindles 757 in a horizontal position as shown in dotted outline in Figure 43 and with the cleaning plates above their respective fruit cups, corners 769 of the bearing blocks strike the upper ends of the stop members 768 so that there will be a relative movement between the beveled gears 765 and the pinions 760. When viewing the spindles 757 from the end bearing the cleaning plates they are seen to rotate in a clockwise direction. After the spindles have been stopped the shaft 707 continues to turn until the cleaning plates have been rotated one hundred eighty degrees to scoop the fruit core and peel from the cup and dispose it upon the then top side of the cleaning plates. Thereafter the rack 713 starts its upward movement to rotate the shaft 707 in a counter-clockwise direction (Figure 43) whereby to rotate the bearing blocks 755 and to carry the cleaning plates 763 upwardly about the axis within the shaft 707.

After the bearing block 755 has been rotated in a counter-clockwise direction to some such position as shown in Figure 43, the corner 770 of said block collides with the head of a bolt 771 to preclude further movement of the bearing block and to stop it with a jar to catapult the peeling and core from the cleaning plate 763 into a receptacle or onto a belt or into a water trough (not shown). After the movement of the bearing block 755 has been stopped incidental to the fruit peeling being knocked therefrom the shaft 707 continues to turn in the counterclockwise direction until the spindle 757 has been rotated through 208 degrees to again position the cleaning plate 763 for a subsequent clockwise movement to engage another fruit cup to be cleaned.

After the pair of fruit cups at station Z have been cleaned by the plates 763 and the plates begin their upward movement, the turret is given a movement to deliver those cups to station W where they will be refilled with a different fruit to be treated at the stations X and Y in the manner above described.

The claims of the present case are limited to combination claims of the various operations performed upon fruit including specifically the combination of two synchronously moving turrets, the transfer mechanism and the various operations to be performed upon the fruit as it moves sequentially from the first turret mechanism to the transfer mechanism and to the second turret mechanism. The claims herein are not drawn specifically to the various operations per se since such claims are reserved for claiming in the other applications herein specifically enumerated.

What is claimed as new and is desired to be secured by Letters Patent of the United States is:

1. A fruit treating apparatus comprising a frame, a turret in said frame, means for moving said turret intermittently, paired fruit cups for half fruits on said turret, stations about said frame at which said cups are adapted to be successively disposed incident to each intermittent movement of said turret, a second turret to receive whole fruit, means for splitting the whole fruit, a mechanism for removing fruit from said second turret and feeding the split fruit to said paired cups on said first turret at one of said stations, a paring mechanism at the succeeding station, a coring mechanism at the next succeeding station, and a mechanism for scavenging said cups at the next succeeding station, the last named station being precedent to the said feeding station.

2. A fruit treating apparatus comprising a frame, a turret in said frame, means for moving said turret intermittently, paired fruit holding cups on said turret, stations about said frame with which successive pairs of cups register, a second turret to receive whole fruit, a mechanism at the first of said stations for receiving fruit from said second turret and for depositing such fruit in the cups at said station, said mechanism comprising a movable carriage for conveying a fruit, a splitting instrumentality having a cutting member and separable elements adapted to enter such fruit longitudinally and to deposit the resulting split fruit segments into the cups at said station, and means for separating said elements, a mechanism for severing the peeling from such fruit at the second of said stations, a device for severing the core from said fruit at the third of said stations, and a cup cleaning mechanism at the fourth of said stations for removing the refuse from said cups, said cups being advanced to the first station incident to further movement of said turret.

3. In a fruit treating apparatus, the combination with a frame having stations thereabout, of a fruit conducting means, a device for bobbing the stem end from a fruit held by said conducting means depending from said frame, a fruit carriage for abducting the stemmed fruit from said conducting means and conveying it to the first of said stations, a turret in said frame, means for intermittently moving said turret, fruit holding cups upon said turret and adapted to be advanced from one station to the next by a movement of said turret, a splitting mechanism operatively associated with the cups when at the first of said stations and having separable parts adatped to enter the abducted fruit longitudinally thereof, means for separating said parts after entry into said fruit to deposit the split fruit sections into the fruit cups at said first station, a mechanism for severing the peel from such fruit at the second of said stations, a device to sever the core from said fruit at the third of said stations, and a cup cleaning mechanism at the fourth of said stations for removing the refuse fiom said cups, said cups being conveyed from the further station to the first station incident to fourth movement of said turret.

4. Means for preparing fruit comprising a loading mechanism having a plurality of fruit receiving receptacles for receiving one at a time whole fruit, end removing means operable in succession upon fruit in said loading mechanism, transfer mechanism for receiving the fruit from said loading mechanism with its end removed and having in combination therewith a fruit splitting mechanism, paired cups to receive the split fruit from said transfer mechanism, means for moving said cups, fruit paring and fruit coring mechanisms in the path of said paired cups, and means for actuating said loading, bobbing, transfer, peeling and coring mechanisms in synchronism with the movement of said cups.

5. In combination, a loading turret having members each for receiving a whole fruit, bobbing means for bobbing the end of fruit in said members and in the path of such fruit as said turret is rotated, a second turret having paired members for receiving half fruit, fruit splitting means intermediate said turrets, a conveyor for receiving fruit from the members on said first turret, conveying it past said splitting means, and depositing the halves thereof into said paired members on said second turret, means for peeling the half fruit in said paired members, and means for actuating said several turrets, conveyor and bobbing and peeling means in synchronism to bob, split and peel fruit.

6. In combination, a loading turret having members each for receiving a whole fruit, means for bobbing the end of fruit in said members and in the path of such fruit as said turret is rotated, a second turret having paired members for receiving half fruit, splitting means intermediate said turrets, a conveyor for receiving fruit from the first turret, conveying it past said splitting means, and depositing the halves thereof into said paired members on said second turret, means for peeling the half fruit in said paired members, means for removing the core from the half fruit in said paired members, and means for actuating said several turrets, conveyor and said several means in synchronism to bob, split, peel and core fruit.

7. In combination, a loading turret having members for receiving whole fruit, a knife for bobbing the end of fruit in said members and in the path of such fruit as said turret is rotated, a second turret having holding means for receiving half fruit, a splitting knife intermediate said turrets, a conveyor for receiving fruit from the first turret, conveying it past said splitting knife, and depositing it into said holding means, knives for peeling the half fruit in said holding means, other knives for removing the core from the half fruit in said holding means, members for discharging the peeled and cored half fruit from said holding means, and means for actuating said several turrets, conveyor, knives and members in synchronism to bob, split, peel and core fruit and to discharge the peeled and cored fruit from said holding means.

8. In combination, a loading turret having members for receiving whole fruit, a knife for bobbing the end of fruit in said members and in the path of such fruit as said turret is rotated, a second turret having paired members for receiving half fruit, a splitting knife intermediate said turrets, a conveyor for receiving fruit from the first turret, conveying it past said splitting knife, and depositing it into said paired members, knives for peeling the half fruit in said paired members, other knives for removing the core from the half fruit in said paired members, members for discharging the peeled and cored half fruit from said paired members, members for scavenging the paired members after the peeled and cored half fruit is discharged therefrom, and means for actuating said several turrets, knives, conveyor and members in synchronism to bob, split, peel and core fruit, to discharge the peeled and cored half fruit from said paired members and to thereafter scavenge said paired members.

9. An automatic machine for processing fruit comprising a fruit turret, fruit holding means spaced apart thereon and movable therewith including relatively movable members having means for holding a whole fruit therebetween, means for bobbing the fruit while so held, a second turret movable adjacent the first turret and including fruit holding means thereon, and movable in synchronism therewith, fruit transfer mechanism including means for bodily moving the whole fruit and transferring it to the fruit holding means of said second turret, means for cutting the fruit in sections during its transfer from the loading means to the holding means of the second turret, and means for peeling the fruit so held in said second turret.

10. An automatic machine for processing whole fruit comprising a plurality of spaced holding means adapted to receive whole fruit one at a time and to hold the same substantially firmly, means for moving the holding means in an endless path, means for bobbing the stem ends while so held, means for bodily moving the bobbed fruit one at a time, means for dividing the fruit longitudinally as they are moved, means for holding each half fruit from turning about its stem axis, means for placing each half fruit on to said second holding means, means for peeling each half fruit while so held, means for subsequently coring each half fruit and means for discharging the cored and peeled half fruit, and means for operating all of said means in substantial continuous synchronism.

11. A fruit treating apparatus comprising a frame having stations, a feed turret, means for intermittently moving said turret, fruit holding means upon said turret for conveying fruit, means on said frame for severing the stem bearing end from fruit in said holding means, a fruit carriage for abducting the stemmed fruit from said holding means, a second turret on said frame, means for intermittently moving said second turret, pairs of fruit holding means on said second turret and adapted to be conveyed from one of said stations to the next by a movement of the second turret, splitting means operatively associated with the fruit holding means of said second turret at one of said stations having separable parts entering the abducted fruit longitudinally thereof and adapted to deposit the separated portions of the split fruit into the holding means at said station, means for separating said parts, a peeling device at another of said stations and comprising a blade movable through the fruit after the first movement of said turret, a coring device at still another of said stations and operable on fruit subsequent to the second movement of said turret to sever the core from the fruit and to lift the fruit from the fruit holding means of the second turret to leave the core and peeling therein, a cleaning mechanism at yet another of said stations and adapted to scavenge the core and peeling from said fruit holding means of the second turret after the further movement of said turret, still further movement of said turret conveying said fruit holding means of the second turret to the first-mentioned of the stations of this turret.

12. An automatic machine for preparing pears comprising an intermittently rotatable turret having a plurality of pear holding means, bobbing means disposed in the path of movement of the holding means and operable in succession upon the pears in said holding means as the turret moves, cutting means for severing a pear substantially in halves along its stem axis, pear conveying means receiving the bobbed pears from the holding means of the turret and including means for carrying each bobbed pear endwise across said severing means to halve the pear, coring means operable upon the cut face of the severed halves of each pear, and mechanism for actuating said turret, said conveying means and said coring means in synchronism.

13. In a fruit processing machine, a rotary turret carrying fruit supporting means, a splitting blade, means including a set of clamps for transferring fruit from said supporting means onto the splitting blade, means for rotating the turret to bring said fruit supporting means into and out of registration with said clamps, means for reciprocating said clamps in timed relation to the operation of the turret, means for contracting and separating said clamps in timed relation to their reciprocated movements to cause them to grasp the fruit on said supporting means, carry the fruit onto the splitting blade and thereafter release the split fruit, and means for coring the split halves of fruit.

14. In a fruit preparation machine, a rotary turret provided with spaced fruit supporting means, each for holding a whole fruit, cutting means for bobbing the whole fruit while on said supporting means, a splitting blade, means including a set of clamps for transferring fruit from said supporting means in succession onto the splitting blade, means for rotating the turret intermittently to bring said fruit supporting means in succession into and out of registration with said clamps, means for reciprocating said clamps in timed relation to the intermittent movement of the turret, means for contracting and separating said clamps in timed relation to their reciprocative movements to cause them to grasp the fruit on the supporting means in registration therewith and carry the fruit onto the splitting blade and thereafter release the split fruit, and means for coring the split halves of fruit.

15. In a fruit preparation machine, an intermittently operable turret having a plurality of spaced fruit supporting means, bobbing means operable in succession upon the fruit on said fruit supporting means, a splitting blade, fruit conveying means including a set of clamps for transferring fruit in succession from said supporting means onto the splitting blade, means for intermittently rotating the turret to bring said fruit supporting means in succession into and out of registration with said clamps, means for reciprocating said clamps in timed relation to the operation of the turret, means for contracting and separating said clamps in timed relation to their reciprocative movements to cause them to grasp the fruit on the registering supporting means, to carry the fruit onto the splitting blade and thereafter release the split fruit, and coring mechanism operatively associated with said conveying means for coring the split halves of the fruit.

MARK EWALD.

REFERENCES CITED

The following references are of record in the file of this patent:

UNITED STATES PATENTS

| Number | Name | Date |
| --- | --- | --- |
| 1,512,410 | Eldridge | Oct. 21, 1924 |
| 1,769,654 | Spencer | July 1, 1930 |

(Other references on following page)

| Number | Name | Date |
|---|---|---|
| 1,583,100 | Reynolds | May 4, 1926 |
| 1,388,916 | Biggs | Aug. 30, 1921 |
| 1,811,832 | Mayer | June 23, 1931 |
| 407,161 | Brooks | July 16, 1889 |
| 1,451,571 | Gay | Apr. 10, 1923 |
| 1,484,446 | Felizianetti | Feb. 19, 1924 |
| 1,583,100 | Reynolds | May 4, 1926 |
| 1,861,084 | Goranson | May 31, 1932 |
| 1,747,706 | Goranson | Feb. 18, 1930 |

| Number | Name | Date |
|---|---|---|
| 1,950,718 | Duncan | Mar. 13, 1934 |
| 1,951,804 | MacDougall | Mar. 20, 1934 |
| 1,973,996 | Reinstein | Sept. 18, 1934 |
| 1,989,090 | Ewald | Jan. 29, 1935 |

FOREIGN PATENTS

| Number | Country | Date |
|---|---|---|
| 17,625 | Australian | Dec. 3, 1929 |

Certificate of Correction

Patent No. 2,418,827. April 15, 1947.

MARK EWALD

It is hereby certified that errors appear in the printed specification of the above numbered patent requiring correction as follows: Column 7, line 37, for "sleeve 174" read *sleeve 173*; column 14, line 69, for "bracket" read *brackets*; column 16, line 11, for "joints" read *joins*; column 33, lines 14 and 15, for "removing" read *moving*; line 50, for "adatped" read *adapted*; line 59, for "fiom" read *from*; line 60, for "further" read *fourth*; line 61, for "fourth" read *further*; column 35, line 24, before "said" strike out "to"; and that the said Letters Patent should be read with these corrections therein that the same may conform to the record of the case in the Patent Office.

Signed and sealed this 24th day of June, A. D. 1947.

[SEAL]

LESLIE FRAZER,
*First Assistant Commissioner of Patents.*